US007439640B2

(12) United States Patent
Takeuchi

(10) Patent No.: US 7,439,640 B2
(45) Date of Patent: Oct. 21, 2008

(54) ELECTROMAGNETIC ACTUATOR USING PERMANENT MAGNETS

(75) Inventor: Kesatoshi Takeuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 11/416,190

(22) Filed: May 3, 2006

(65) Prior Publication Data

US 2007/0018765 A1 Jan. 25, 2007

(30) Foreign Application Priority Data

Jul. 25, 2005 (JP) ............................ 2005-214838

(51) Int. Cl.
*H02K 41/00* (2006.01)

(52) U.S. Cl. .............................. 310/12; 310/13; 310/15

(58) Field of Classification Search ................... 290/54; 310/10, 12, 13, 15

See application file for complete search history.

(56) References Cited

FOREIGN PATENT DOCUMENTS

| | | | |
|---|---|---|---|
| JP | A 5-205232 | | 8/1993 |
| JP | A 6-12796 | | 1/1994 |
| JP | A 6-311720 | | 11/1994 |
| JP | A 2002-90705 | | 3/2002 |
| JP | 2003-199312 | * | 7/2003 |
| JP | A 2004-264819 | | 9/2004 |

* cited by examiner

*Primary Examiner*—Darren Schuberg
*Assistant Examiner*—Iraj A Mohandesi
(74) *Attorney, Agent, or Firm*—Oliff & Berridge, PLC

(57) ABSTRACT

An actuator mechanism having a different magnet polarity arrangement than the conventional mechanisms is provided. The actuator mechanism 100 has a magnet unit 210 that includes magnets 30 and an electromagnetic coil unit 110 that includes an electromagnetic coil. the relative positions of the magnet unit 210 and the magnetic coil unit 110 can change. The magnet unit 210 includes a yoke member 20 and two or more magnets 30. The two magnets 30 are pulled toward the yoke member 20 in the state where identical poles face each other across the yoke member 20.

3 Claims, 34 Drawing Sheets

COMPARISON EXAMPLE

EMBODIMENT

LEFT POSITION
100
110
210
120
N S S N

CENTER POSITION
N S S N

RIGHT POSITION
N S S N

RIGHT POSITION

CENTER POSITION

LEFT POSITION
100c
210c
120
110c
30c
20c
N
S

CENTER POSITION

MOVING RIGHT

MOVING LEFT

EXPANDED VIEW OF PERMANENT MAGNET RODS

APPLICATION EXAMPLE 1

APPLICATION EXAMPLE 2

APPLICATION EXAMPLE 3

APPLICATION EXAMPLE 4

APPLICATION EXAMPLE 5

COIL

ELECTROMAGNETIC ACTUATOR USING PERMANENT MAGNETS

CROSS-REFERENCE TO RELATED APPLICATIONS

The present application claims the priority based on Japanese Patent Application No. 2005-214838 filed on Jul. 25, 2005, the disclosure of which is hereby incorporated by reference in its entirety.

BACKGROUND OF THE INVENTION

1. Field of the Invention

The present invention relates to an electromagnetic actuator that uses permanent magnets.

2. Description of the Related Art

Electromagnetic actuators that use permanent magnets have been widely employed (see JP2002-90705A, and JP2004-264819A, for example).

With an electromagnetic actuator that uses permanent magnets, electromagnetic force is generated using the N and S poles of the magnets, but the problem arises that, when constructing the electromagnetic actuator, various limitations exist in connection with the placement of the magnetic poles of the magnets (i.e., due to the existence of the N and S poles). However, in the conventional art, it has been acknowledged that there is no room for design modification to alleviate the structural limitations in connection with the placement of the magnetic poles.

SUMMARY OF THE INVENTION

An object of the present invention is to provide an electromagnetic actuator that has a different placement of the magnetic poles than the technology of the prior art.

In an aspect of the present invention, a first actuator that uses electromagnetic drive power is provided. The first actuator comprises an electromagnetic actuator mechanism that has a magnet unit including magnets and an electromagnetic coil unit including an electromagnetic coil, wherein relative positions of the magnet unit and the electromagnetic coil unit are variable. The magnet unit includes: a yoke member including a plate portion; and first and second magnets that are magnetically pulled onto either side of the plate portion with the identical poles of each of the magnets facing each other across the plate portion. Main surfaces of the plate portion of the yoke member are set to have a size which encompasses respective surfaces of the first and second magnets that face the plate portion, thereby causing the first and second magnets being magnetically pulled onto the plate portion.

In this first actuator, because first and second magnets that are pulled onto either side of the plate portion of the yoke member such that identical poles face each other across the plate portion of the yoke member, a construction in which identical magnetic poles face various directions outward from the yoke member can be obtained. As a result, an actuator that efficiently uses the magnet flux generated by these magnets can be constructed. Moreover, because the first and second magnets are pulled onto the same plate portion, identical magnetic pole can face the two opposite directions facing outward from the center of the plate portion. In addition, the pulling force between the magnets and the yoke member can be made larger than the repulsion force between the first and second magnets because the main surfaces of the plate portion of the yoke member are set to have a size which encompasses respective surfaces of the first and second magnets that face the plate portion.

The first and second magnets may have substantially same magnet thicknesses, and a thickness of the plate portion may set to at least 40% of the magnet thickness.

With this construction, the pulling force between the magnets and the yoke member can be made sufficiently large.

The electromagnetic coil unit may includes an electromagnetic coil that revolves around the magnet unit, and the relative positions of the magnet unit and the electromagnetic coil unit may change along a central axis of the electromagnetic coil.

Alternatively, the electromagnetic coil unit may include a first electromagnetic coil that faces the first magnet and a second electromagnetic coil that faces the second magnet, and the relative positions of the magnet unit and the electromagnetic coil unit may change along a line perpendicular to a line that travels through the first electromagnetic coil, magnet unit and second electromagnetic coil.

According to another aspect of the present invention, there is provided a second actuator that uses electromagnetic drive power, comprising: an electromagnetic actuator mechanism that has a magnet unit including magnets and an electromagnetic coil unit including an electromagnetic coil, wherein relative positions of the magnet unit and the electromagnetic coil unit are variable. The magnet unit includes: a yoke member including a plate portion; first and second magnets that are magnetically pulled onto either side of the plate portion with the identical poles of each of the magnets facing each other across the plate portion. The yoke member is constructed so that the plate portion has a protrusion portion protruding from the first and second magnets when viewed along a direction of thickness of the plate portion, thereby causing the first and second magnets being magnetically pulled onto the plate portion.

In this second actuator, because first and second magnets that are pulled onto either side of the plate portion of the yoke member such that identical poles face each other across the plate portion of the yoke member, a construction in which identical magnetic poles face various directions outward from the yoke member can be obtained. As a result, an actuator that efficiently uses the magnet flux generated by these magnets can be constructed. Moreover, because the first and second magnets are pulled onto the same plate portion, identical magnetic pole can face the two opposite directions facing outward from the center of the plate portion. In addition, the pulling force between the magnets and the yoke member can be made larger than the repulsion force between the first and second magnets because the yoke member is constructed so that the plate portion has a protrusion portion protruding from the first and second magnets when viewed along a direction of thickness of the plate portion.

According to still another aspect of the present invention, there is provided a third actuator that uses electromagnetic drive power, comprising: an electromagnetic actuator mechanism that has a magnet unit including magnets and an electromagnetic coil unit including an electromagnetic coil, wherein relative positions of the magnet unit and the electromagnetic coil unit are variable. The magnet unit includes: a yoke member; and first and second magnets that are magnetically pulled onto either side of the yoke member with the identical poles of each of the magnets facing each other across the yoke member. The electromagnetic coil unit includes an electromagnetic coil that revolves around the magnet unit, and the relative positions of the magnet unit and the electromagnetic coil unit change along a central axis of the electromagnetic coil.

In this third actuator, because first and second magnets that are pulled onto either side of the yoke member such that identical poles face each other across the yoke member, a construction in which identical magnetic poles face various directions outward from the yoke member can be obtained. As a result, an actuator that efficiently uses the magnet flux generated by these magnets can be constructed.

PREFERRED FEATURES OF THE INVENTION

The actuator may further include a control device that controls the electromagnetic actuator mechanism, wherein the control device includes a reference current value determination unit that determines a reference current value in accordance with a deviation of a controlled variable related to the position of the electromagnetic actuator mechanism as well as a drive unit that drives the electromagnetic coil based on the reference current value, and the reference current value determination unit determines the reference current value to be a positive value, zero or a negative value where the deviation is a negative value, zero or a positive value, respectively.

According to this actuator, because the reference current value is determined to be a positive value, zero or a negative value where the deviation of the controlled variable is a negative value, zero or a positive value, respectively, and the electromagnetic coil is driven based on this reference current value, good control characteristics can be obtained even where the controlled variable has a non-linear relationship to the manipulated variable (i.e., the coil current).

It is acceptable if the reference current value determination unit determines the reference current value to be a positive value, zero or a negative value that is preset in response to whether the deviation is a negative value, zero or a positive value, and the drive unit drives the electromagnetic coil using the reference current value.

According to this construction, because the electromagnetic coil is driven using any of the three current values, simple control may be realized.

The control device may further include a counter that counts the number of continuous occurrences of a deviation having the same positive or negative sign when a deviation having the same sign is continuously generated in prescribed cycles; a first correction coefficient generator that generates a first correction coefficient that decreases as the number of continuous occurrences of a deviation having the same sign increases; and an accumulator that multiplies the reference current by the first correction coefficient and accumulates the results, wherein the drive unit drives the electromagnetic coil based on a current value corresponding to the accumulated result obtained by the accumulator.

According to this construction, the current value can be gradually increased after the sign of the deviation changes, and therefore excessive positional change can be prevented when the deviation is near zero.

The control device may further include a second correction coefficient generator that generates a second correction coefficient that increases as the number of continuous occurrences of a deviation having the same sign increases; and a multiplier that multiplies the accumulated result of the accumulator by the second correction coefficient, wherein the drive unit drives the electromagnetic coil based on a current value corresponding to the result obtained by the multiplier.

According to this construction, the rate of increase of the current value after the sign of the deviation changes can be further reduced, and therefore excessive positional change when the deviation is near zero can be prevented with increased efficiency.

The present invention can be implemented in various forms, and can be realized as an actuator, a control device for an actuator or a actuator control method, for example.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention will be described below in the following sequence.

A. Various embodiments of electromagnetic actuator mechanisms

B. Various embodiments of control devices

C. Application examples of actuator

D. Variations

A. Various Embodiments of Electromagnetic Actuator Mechanisms

Figure 1A:
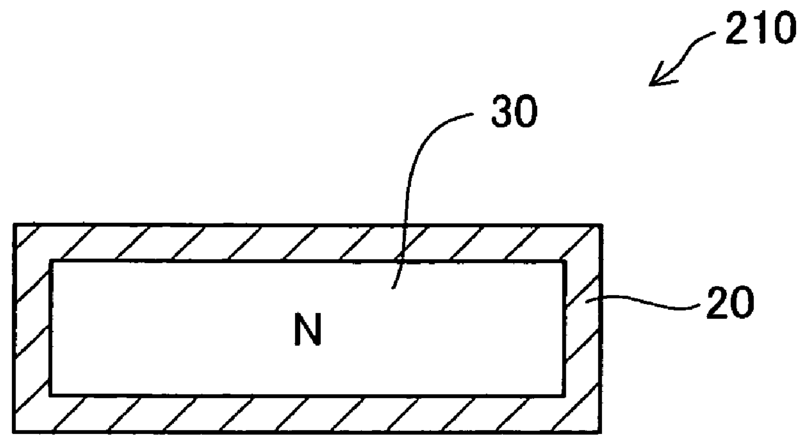
FIGS. 1A and 1B are explanatory drawings showing an example of a magnet unit used by a magnetic actuator mechanism of the present invention.
Figure 1B:
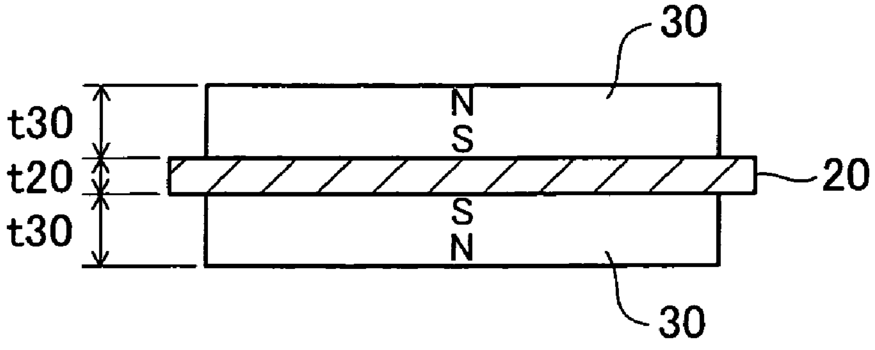

FIG. 1A is a plan view of a magnet unit 210 used by an electromagnetic actuator mechanism according to an embodiment of the present invention, and FIG. 1B is a front view thereof. This magnet unit 210 comprises a yoke member 20 having a flat plate configuration and two flat plate-shaped permanent magnets 30 having an identical configuration. The two permanent magnets 30 are pulled toward the yoke member 20 in the state where identical poles are made to face each other. In this example, the S poles of the two permanent magnets 30 are in contact with the main surfaces of the yoke member 20. Incidentally, the 'main surfaces' of a flat plate-shaped member refers to the widest surfaces of the six surfaces of such member. In the discussion below, the 'main surfaces' may be referred to simply as 'surfaces', and the other surfaces may be referred to as the 'side surfaces'. Furthermore, where the configuration of the yoke member is not that of a simple flat plate, but includes flat plate sections and a non-flat plate section (such as a protrusion), the surfaces comprising the flat plate sections are termed the 'main surfaces'.

In this Specification, the magnet unit is also termed a 'magnet structure', and the electromagnetic coil unit (described below) of the electromagnetic actuator mechanism is also termed an 'electromagnetic coil structure' or 'coil structure'.

As shown in FIG. 1A, the area of each main surface of the plate-shaped yoke member 20 is set to a size larger than that of each magnet 30. In other words, the main surfaces of the yoke member 20 are set to a size that completely encompasses the adjacent surfaces of the magnets 30.

Figure 2A:
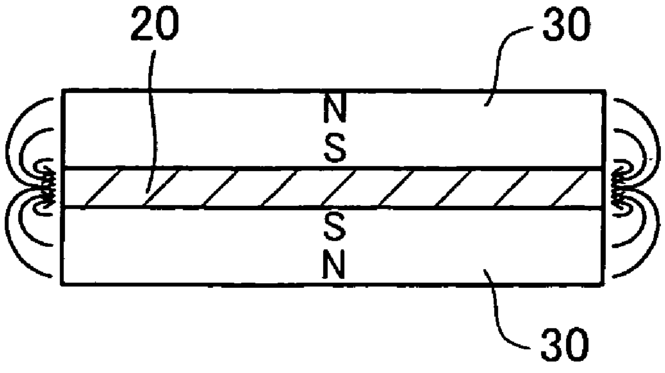
FIGS. 2A and 2B are explanatory drawings showing magnet units of an embodiment and a comparison example.
Figure 2B:
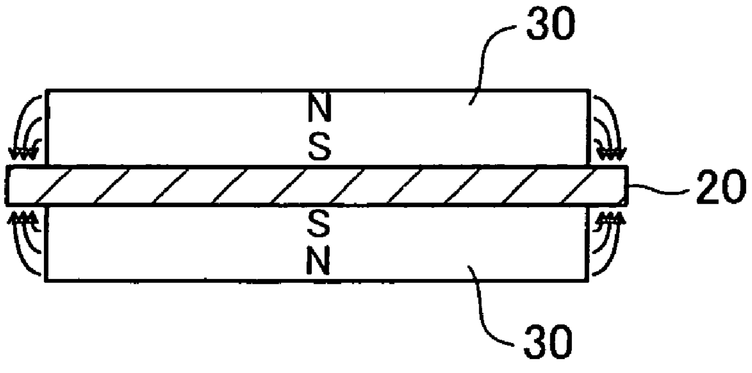

FIGS. 2A and 2B are explanatory drawings showing the magnet units of an embodiment and a comparison example. In the magnet unit of the comparison example shown in FIG. 2A, the main surfaces of the yoke member 20 and the magnets 30 have the same size. In this case, because the lines of electromagnetic force emitted from the two magnets 30 are oriented in mutually opposing directions as indicated by the arrows, a strong repulsion force operates between the two magnets 30. As a result, it is difficult to hold the two magnets 30 in place with the yoke member 20.

On the other hand, in the magnet unit of the embodiment shown in FIG. 2B, because the main surfaces of the yoke member 20 are larger than the main surfaces of the magnets 30, the lines of electromagnetic force from the two magnets 30 are guided by the yoke member 20 to form an electromagnetic closed circuit (N pole→yoke member→S pole). Consequently, repulsion force does not operate between the two magnets 30, and each magnet 30 is maintained in a state in which it is pulled toward the yoke member 20. Therefore, in the magnet unit of this embodiment, a construction will be stably maintained in which common poles of the two magnets 30 (in this example, the N poles) are oriented in opposing directions (the vertical directions in the drawing) while the magnets 30 are disposed across the yoke member 20.

In order to respectively pull the two magnets 30 to the yoke member 20 in a stable fashion, it is preferred that the main surfaces of the yoke member 20 be larger than the main surfaces of the magnets 30 over their entire circumference, as shown in FIG. 1A (i.e., it is preferred that the yoke member 20 protrude beyond the outer edges of the magnets 30). However, it is acceptable if the main surfaces of the magnets 30 extend as far as the edges of the main surfaces of the yoke member 20 over a part of the total circumference thereof. It is furthermore preferred that the thickness t20 of the yoke member 20 (see FIG. 1B) be set to at least 40% of the thickness t30 of each magnet 30. The reason for this is that if the yoke member 20 is too thin, there is increased leakage of electromagnetic force and a strong repulsion force may occur between the two magnets 30. From the standpoint of minimizing the actuator size, it is preferable that the thickness t20 of the yoke member 20 is not more than the thickness t30 of the magnet 30. It is preferred that the yoke member 20 comprise a number of stacked thin plates, but it may comprise a single plate. Furthermore, while the yoke member 20 may comprise any highly magnetic material, it is preferred that it be made of SPCC steel.

Figure 3A:
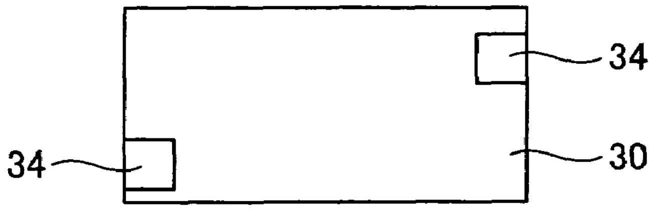
FIGS. 3A through 3F are explanatory drawings showing in detail an example of the construction of a magnet unit of an embodiment.
Figure 3B:
Figure 3C:
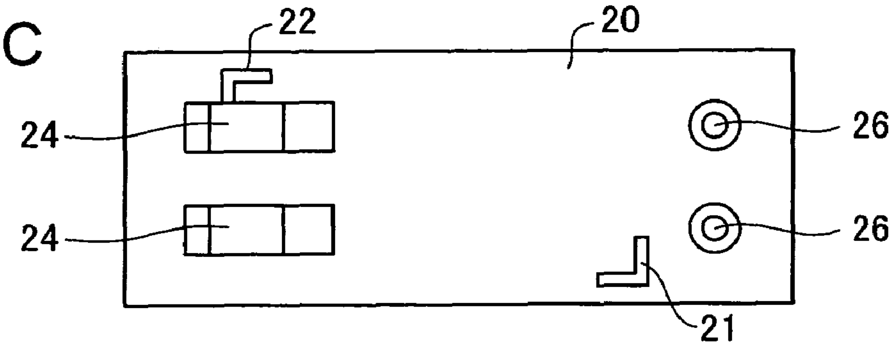
Figure 3D:
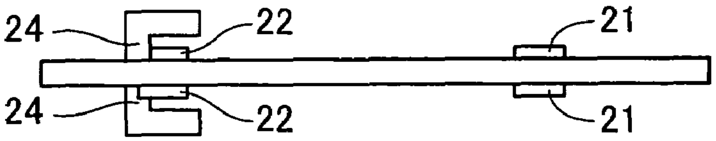
Figure 3E:
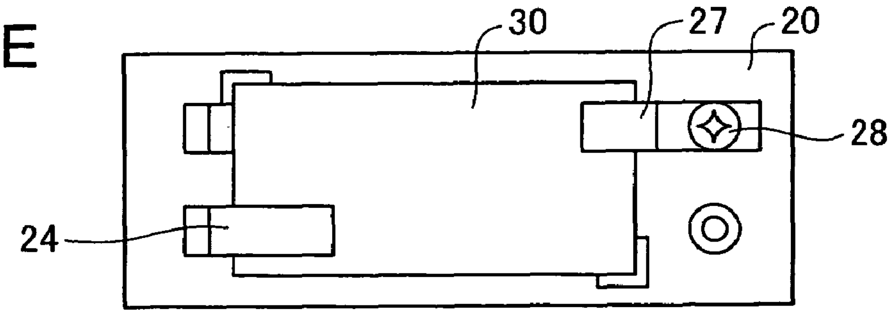
Figure 3F:
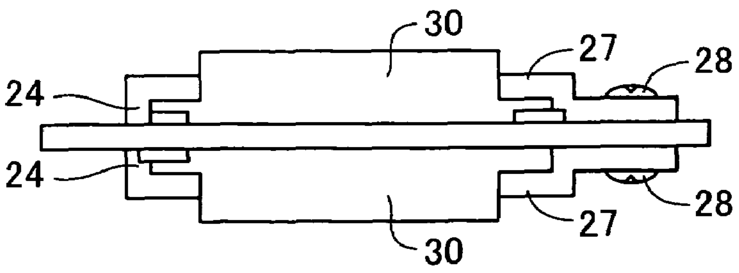

FIGS. 3A-3F are explanatory drawings showing in detail an example of the construction of the magnet unit of an embodiment. FIGS. 3A and 3B are a plan view and a front view of a magnet 30. Two notches 34 are formed in one of the main surfaces of the magnet 30 close to opposing corners of the rectangular shape. FIGS. 3C and 3D are a plan view and a front view of the yoke member 20. Protrusions 21, 22 that come into contact with the outer edge surfaces of a magnet 30, locking protrusions 24 that engage with the notches 34 in the magnet 30, and two screw holes 26 are formed in the main surface of the top side of the yoke member 20. The bottom side of the yoke member 20 has the same construction. FIGS. 3E and 3F are a plan view and a front view of the magnet unit where the two magnets 30 are assembled onto the yoke member 20. During assembly, first, one of the two notches 34 of each magnet 30 is fitted under one of the locking protrusions 24 formed on the yoke member 20, a clamp member 27 is fitted into the other notch 34, and the clamp member 27 is secured to the screw hole 26 using a screw 28. As a result, the magnet 30 is secured to the yoke member 20 by the locking protrusion 24 and the clamp member 27. However, as explained with reference to FIGS. 1A-1B and 2A-2B, because the magnets 30 are pulled onto the yoke member 20 by electromagnetic pulling force, the magnets 30 can also be secured to the yoke member 20 via simpler securing means. For example, they may both be secured by adhesive. In addition, another member may be inserted between each magnet 30 and the yoke member 20, but from the standpoint of increasing the pulling force between the magnets and the yoke member, it is preferred that no other member be inserted between each magnet and the yoke member.

Figures 4A, 4B, 4C:
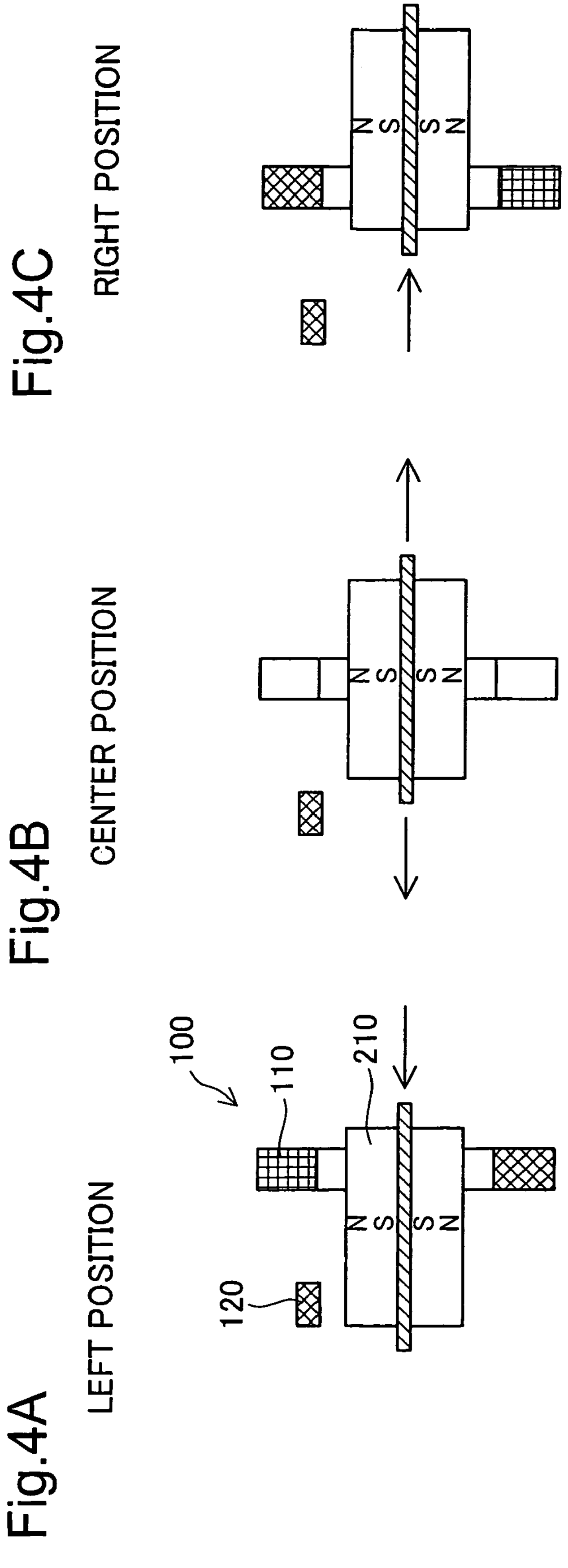
FIGS. 4A through 4C are side views of the construction of an actuator mechanism of a first embodiment.

FIG. 4A is a side view of the construction of an actuator mechanism of a first embodiment. This actuator mechanism 100 has an electromagnetic coil unit 110 and a magnet unit 210. The coil of the electromagnetic coil unit 110 revolves around the magnet unit 210. Furthermore, the electromagnetic coil unit 110 is secured to a support member not shown, and a position sensor 120 that detects the position of the magnet unit 210 is disposed on this support member. An electromagnetic sensor such as Hall element can be used as this position sensor. Alternatively, an optical encoder or other type of position sensor may be used.

With this construction, because the coil of the electromagnetic coil unit 110 revolves around the magnet unit 210, when electric current is impressed to the electromagnetic coil unit 110, the electrical current in the top portion of the coil, shown in FIG. 4A, flows in a direction opposite to that of the current flowing in the bottom portion. At the same time, electromagnetic fields are generated upward and downward from the magnet unit 210. Therefore, when current is impressed to the coil, drive power oriented in the same direction (i.e., leftward or rightward) can be generated in both the top and bottom portions of the coil. For example, when the magnet unit 210 is to be moved rightward from the leftmost position (FIG. 4A), current flowing in a prescribed direction is impressed to the electromagnetic coil unit 110. When the magnet unit 210 is to be moved in the leftward direction, a current is impressed in the opposite direction from this prescribed direction.

As described above, using the actuator mechanism 100 shown in FIGS. 4A-4C, because drive force in the same direction is generated in both the top portion and the bottom portion of the electromagnetic coil that revolves around the magnet unit 210, the wasteful operation of force in directions other than the direction of driving can be prevented. As a result, the actuator mechanism 100 offers the advantage of causing virtually no vibration or noise due to the wasteful generation of electromagnetic force running in directions other than the direction of driving.

Figure 5A:
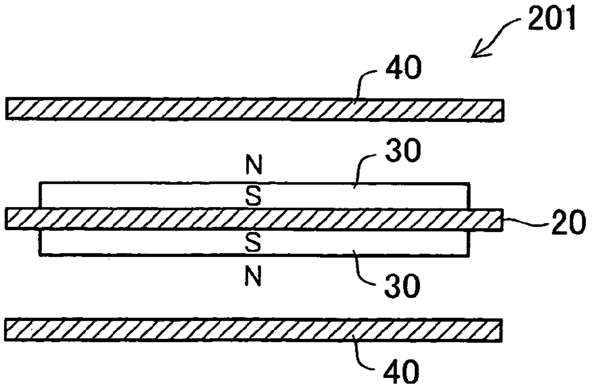
FIGS. 5A through 5D are explanatory drawings showing various yoke constructions for a magnet unit.
Figure 5B:
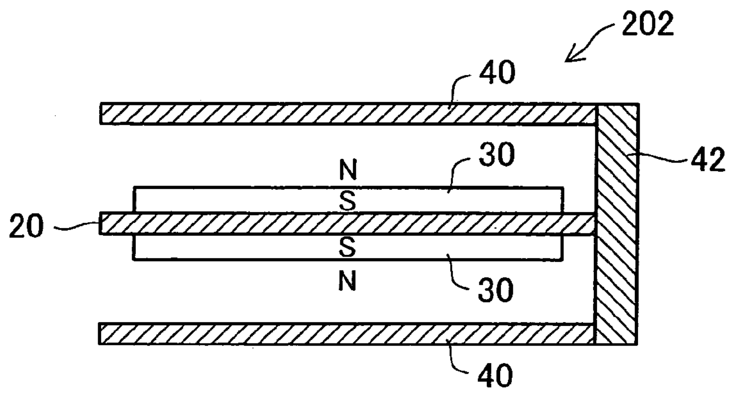
Figure 5C:
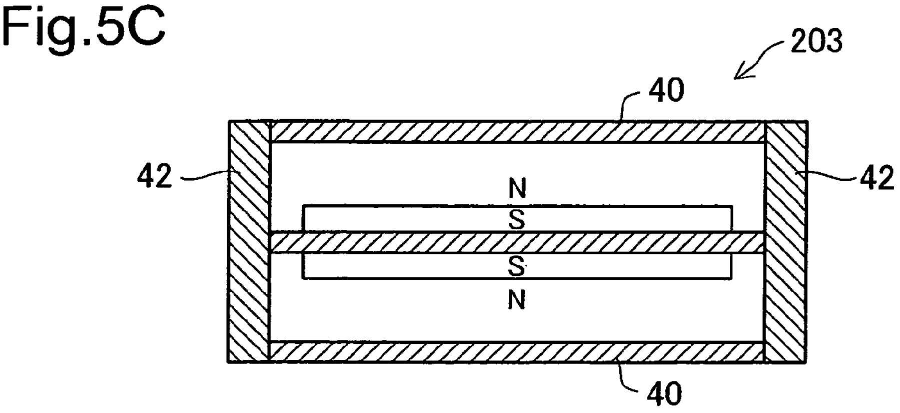
Figure 5D:
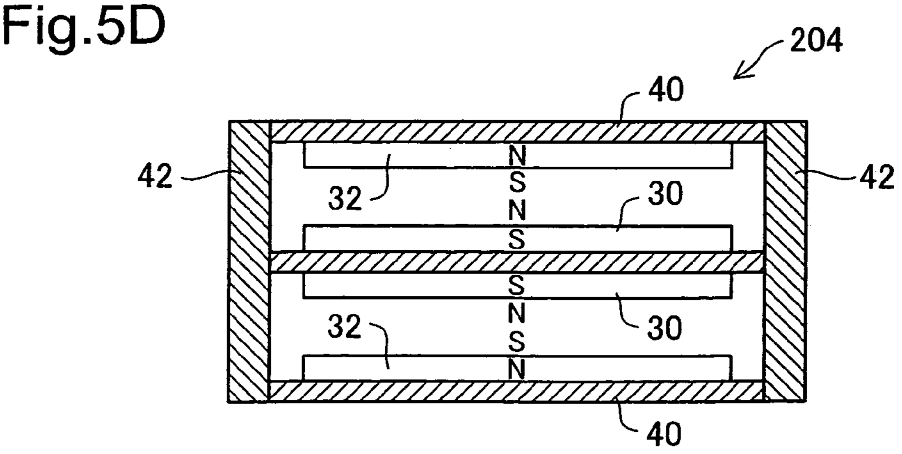

FIGS. 5A-5D show various yoke constructions for a magnet unit. The magnet unit 201 of FIG. 5A has a construction in which second yoke members 40 are added above and below the magnet unit 210 shown in FIG. 1B. The electromagnetic coil unit is disposed in the spaces between the magnets 30 and the second yoke members 40. According to this construction, the leakage of electromagnetic force from the coil can be prevented. The magnet unit 202 of FIG. 5B has a construction in which a third yoke member 42 is added to one of the lateral sides of the magnet unit 201 shown in FIG. 5A. The magnet unit 203 of FIG. 5C has a construction in which third yoke members 42 are respectively added to both lateral sides of the magnet unit 201 shown in FIG. 5A. In the constructions of FIGS. 5B and 5C, because a closed magnetic circuit will be formed, efficiency will be improved. The magnet unit 204 of FIG. 5D has a construction in which magnets 32 are respectively added to the inside of the top and bottom second yoke members 40 of the magnet unit 203 shown in FIG. 5C. According to this construction, the magnetic flux of the electromagnetic coil is used more effectively, resulting in the generation of a larger amount of torque.

Figure 6A:
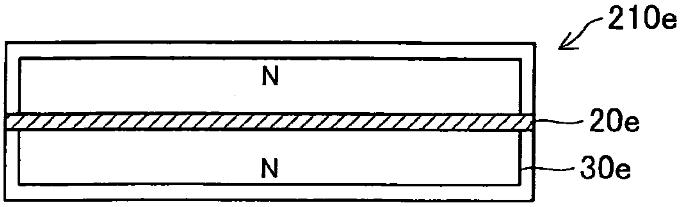
FIGS. 6A through 6F are explanatory drawings showing different constructions for a magnet unit.
Figure 6B:
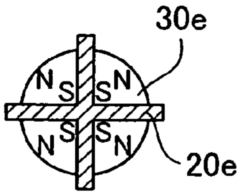
Figure 6C:
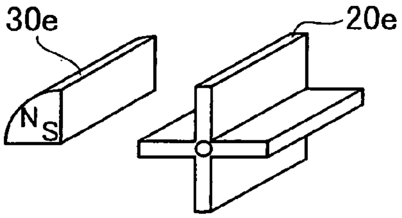
Figure 6D:
Figure 6E:
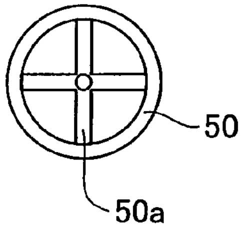
Figure 6F:
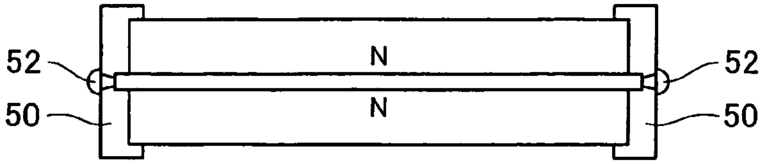

FIGS. 6A-6F show other constructions of a magnet unit. FIGS. 6A, 6B are a front view and a side view of an assembly comprising only a yoke member **20*e* and magnets 30*e*. FIG. 6C is a perspective view of the yoke 20*e* and a magnet 30*e*. The magnet unit 210*e* has a long yoke member 20*e* having a roughly cross-shaped cross-sectional configuration and four long magnets 30*e* that are wedged into the four triangular spaces formed by the cross-shaped yoke member 20*e*. As shown in FIG. 6B, the cross-section of each magnet 30*e* is a quarter-circle (i.e., a fan shape with a central angle of 90°), and each magnet 30*e* is magnetized such that the area at the central angle comprises one pole (the S pole), and the outer arc area comprises the other pole (the N pole). As shown in FIG. 6B, it is preferred that, of the surfaces of the yoke member 20*e* and the magnets 30*e* that are in contact with each other (referred to as contact surfaces), the contact surfaces of the yoke member 20*e* be larger than the contact surfaces of the magnets 30*e*. FIGS. 6D and 6E comprise a side view and a front view of a cap 50. Both ends of the assembled yoke member 20*e* and four magnets 30*e* are covered respectively using caps 50, as shown in FIG. 6F. A roughly cross-shaped groove 50*a* is formed on the inside of each cap 50, and this groove 50*a* houses an end of the cross-shaped yoke member 20*e*. The caps 50 are secured to the yoke member 20*e* by screws 52. This magnet unit 210*e* has a construction wherein the cross-sectional configuration is roughly circular and the entire circumference is magnetized to one pole (here, the N pole). Therefore, by placing a cylindrical electromagnetic coil around the magnet unit 210*e***, drive power will be generated from nearly all portions of the electromagnetic coil.

FIGS. 7A-7D show other constructions of a magnet unit. The magnet unit **210*f* shown in FIGS. 7A and 7B have a long and hollow yoke member 20*f* having a roughly square cross-sectional configuration, and four long magnets 30*f* disposed on the outer surfaces of the yoke member 20*f*. Each magnet 30*f* has a plate-shaped configuration and is magnetized such that the inner surface comprises the S pole and the outer surface comprises the N pole. Protrusions that operate to partition the spaces in which the magnets 30*f* are housed are disposed at the four corners of the yoke member 20*f*. This magnet unit 210*f* has a roughly rectangular cross-sectional configuration, and the entire outer circumference thereof is magnetized to one pole (in this example, the N pole). Therefore, by placing a roughly rectangular pillar-shaped electromagnetic coil around the magnet unit 210*e***, drive power will be generated from nearly all portions of the electromagnetic coil.

Figure 7A:
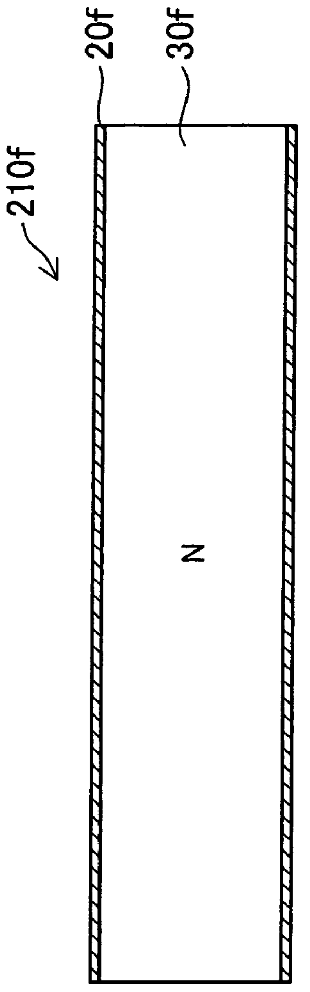
FIGS. 7A through 7D are explanatory drawings showing still other constructions for a magnet unit.
Figure 7B:
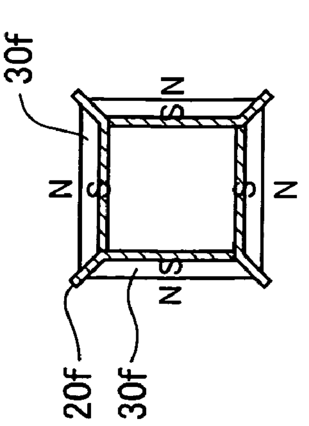
Figure 7C:
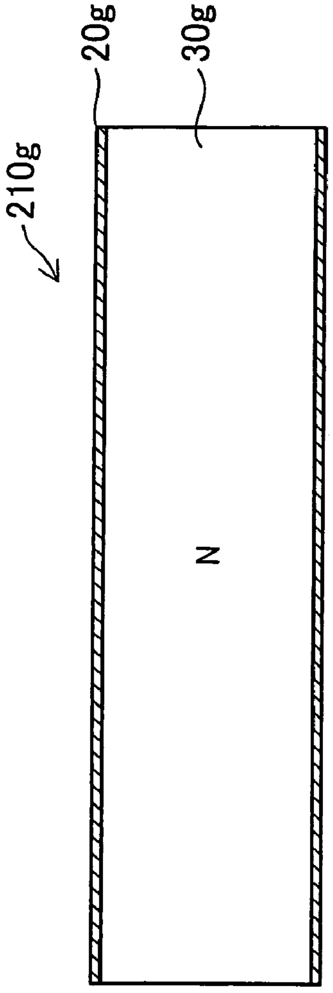
Figure 7D:
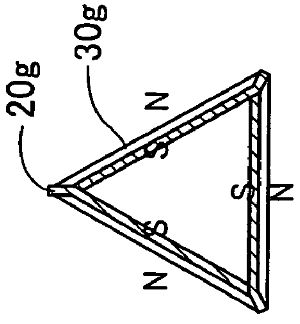

The magnet unit **210*g* shown in FIGS. 7C and 7D has a long yoke member 20*g* having a roughly triangular cross-sectional configuration and three long magnets 30*g* disposed on the outer surfaces of the yoke member 20*g*. Each magnet 30*g* has a plate-shaped configuration and is magnetized such that the inner surface forms the S pole and the outer surface forms the N pole. Protrusions that operate to partition the spaces in which the magnets 30*g* are housed are disposed at the three corners of the yoke member 20*g*. This magnet unit 210*g* has a roughly triangular cross-sectional configuration, and the entire outer circumference thereof is magnetized to one pole (in this example, the N pole). Therefore, placing a triangular pillar-shaped electromagnetic coil around the magnet unit 210***g*, drive power will be generated from nearly all portions of the electromagnetic coil.

As can be seen from the various examples provided above, the magnet unit may have various types of cross-sectional configurations including geometric shapes such as a polygon or circle. Furthermore, it is preferred that the configuration of the electromagnetic coil match or resemble the cross-sectional configuration of the magnet unit. If such a matching magnet unit and an electromagnetic coil are used, an efficient linear actuator may be obtained. Furthermore, because this type of linear actuator does not generate unnecessary force that operates in directions perpendicular to the direction of driving, an actuator having minimal vibration and noise may be formed.

Figure 8B:
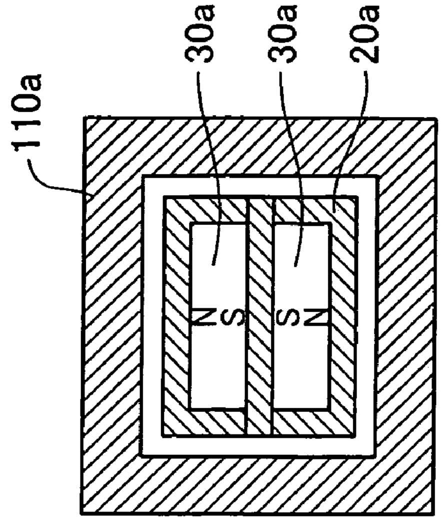
FIGS. 8A and 8B are side views of the construction of an actuator mechanism of a second embodiment.
Figure 8A:
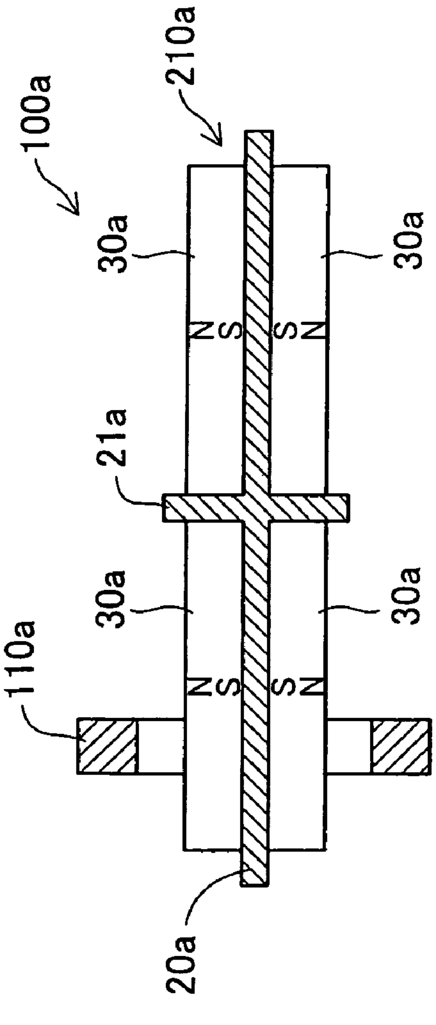

FIGS. 8A and 8B are explanatory drawings showing the construction of an actuator mechanism of a second embodiment. The magnet unit 210*a* of this actuator mechanism 100 has two pairs of magnets 30*a* disposed on both the top and bottom surfaces of the yoke member 20*a*. While two protrusions 21*a* are disposed in the center of the yoke member 20*a* in order to partition off the spaces in which the two magnets 30*a* are housed, these protrusions 21*a* may be omitted. As shown in FIG. 8B, the magnet unit 210*a* has a roughly rectangular cross-sectional configuration, and the coil of the electromagnetic coil unit 110*a* revolves around the magnet unit 210*a*. The position sensor is not shown for convenience of illustration. This actuator mechanism 100*a* can also generate drive power using the method employed by the mechanism shown in FIGS. 4A-4C. In addition, a construction may be adopted in which the yoke member is extended in the longitudinal direction and a larger number of magnets are used.

Figure 9B:
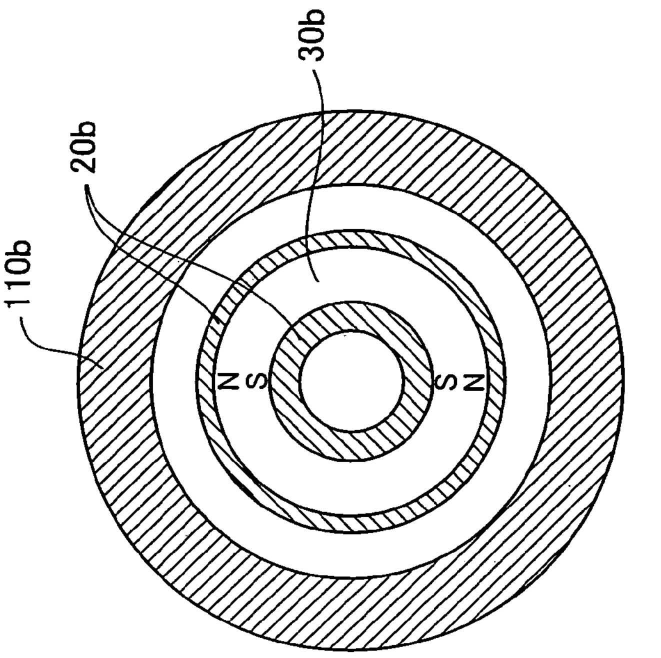
FIGS. 9A and 9B are side views of the construction of an actuator mechanism of a third embodiment.
Figure 9A:
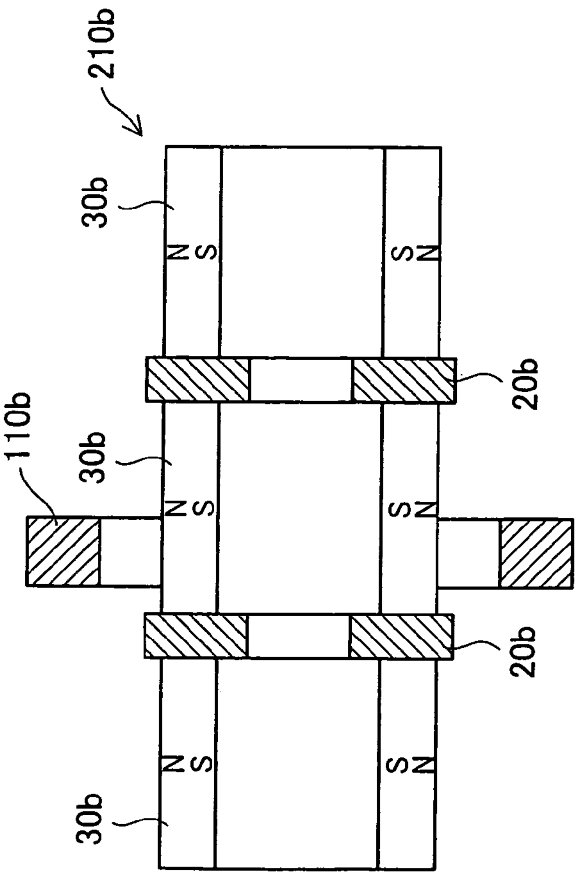

FIGS. 9A and 9B are explanatory drawings showing the construction of an actuator mechanism of a third embodiment. The magnet unit 210*b* of this actuator mechanism 100*b* comprises three concentric hollow tube-shaped magnets 30*b* that are separated from each other by yoke members 20*b* disposed in the spaces therebetween. As shown in FIG. 9B, the magnet unit 210*b* has a roughly hollow cylindrical cross-sectional configuration, and the coil of the electromagnetic coil unit 110*b* revolves around the magnet unit 210*b*. The position sensor is omitted from the drawing for convenience of illustration. This actuator mechanism 100*b* can also generate drive power using the method employed by the mechanism shown in FIGS. 8A-8B. In addition, a construction may be adopted in which the yoke member is extended in the longitudinal direction and a larger number of magnets are used.

Figures 10A, 10B, 10C:
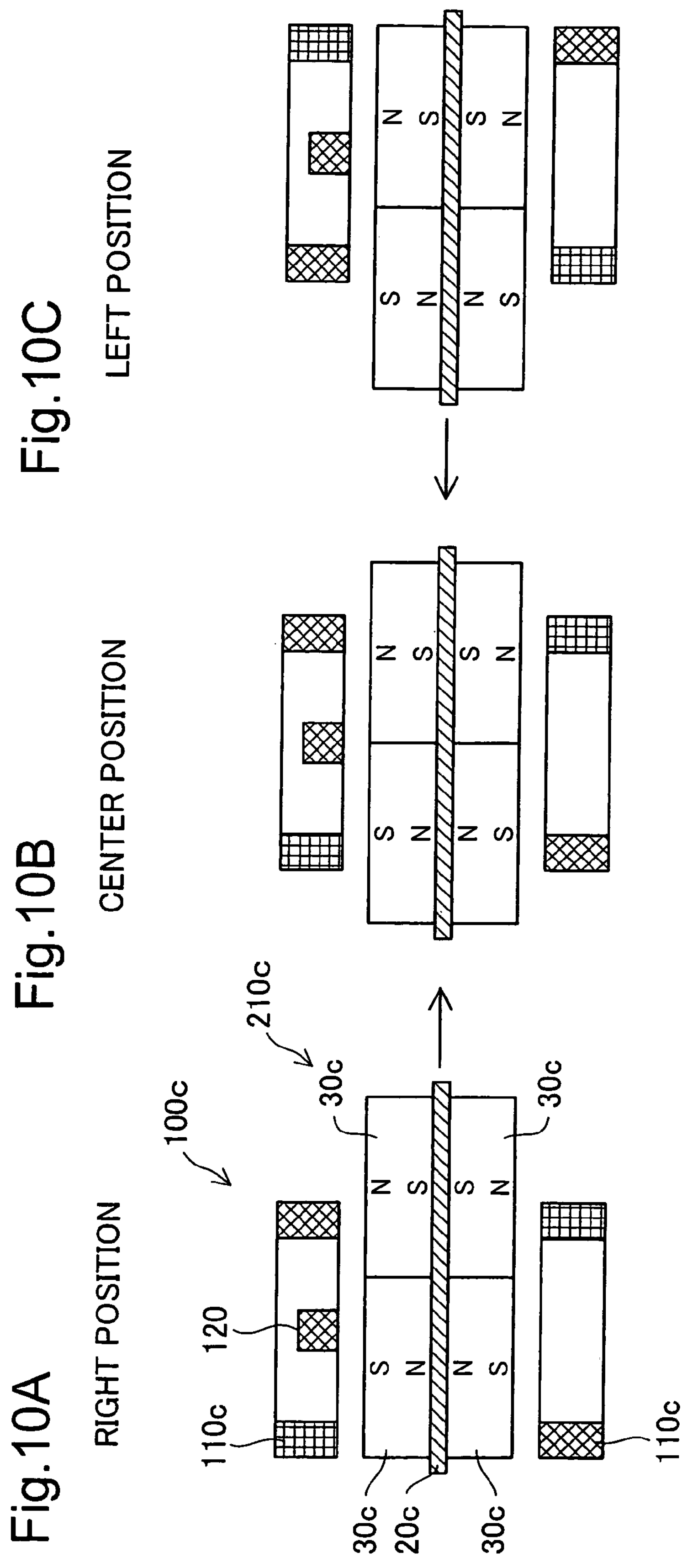
FIGS. 10A through 10C are side views of the construction of an actuator mechanism of a fourth embodiment.

FIGS. 10A-10C are explanatory drawings showing the construction of an actuator mechanism of a fourth embodiment. The magnet unit 210*c* of this actuator mechanism 100*c* comprises four magnets 30*c* disposed on the top and bottom surfaces of the yoke member 20*c* such that each surface has two magnets. The two magnets 30*c* disposed on the top surface of the yoke member 20*c* are magnetized in opposite directions, as are the two magnets 30*c* disposed on the bottom surface of the yoke member 20*c*. However, the magnets 30*c* that face each other across the yoke member 20*c* are disposed so that identical poles are oriented toward the yoke member 20*c*. The coils of electromagnetic coil unit 110*c* are respectively disposed above and below the magnet unit 210*c*. A position sensor 120 is disposed on the upper coil. The magnet unit 210*c* can be driven to move within the range shown in FIGS. 10A-10C through the impression of current to the electromagnetic coil unit 110*b*. During such movement, opposite currents flow in the upper coil and the lower coil.

Figures 11A, 11B, 11C:
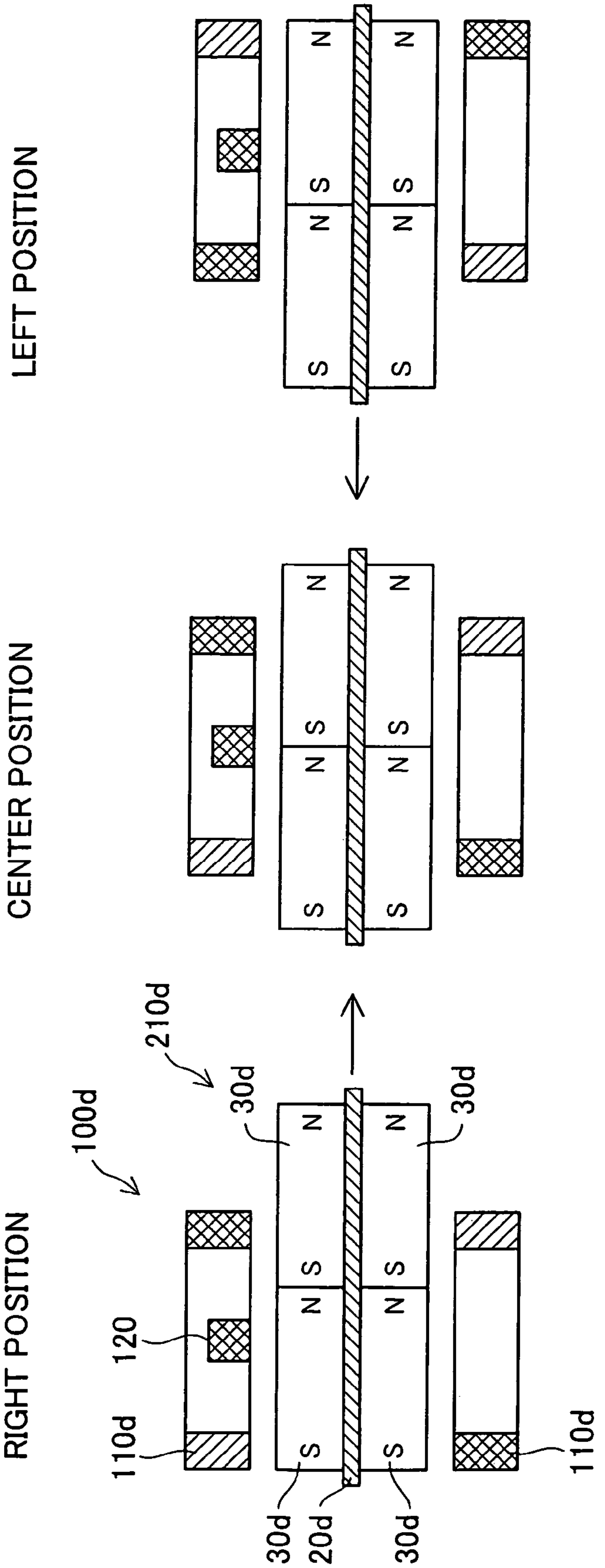
FIGS. 11A through 11C side views of the construction of an actuator mechanism of a fifth embodiment.

FIGS. 11A-11C are explanatory drawings showing the construction of an actuator mechanism of a fifth embodiment. The magnet unit 210*d* of this actuator mechanism 100*d* also comprises four magnets 30*c* disposed on the top and bottom surfaces of the yoke member 20*c* such that each surface has two magnets. However, unlike the mechanism shown in FIGS. 10A-10C, the poles of each magnet 30*d* are oriented along the directions of movement (the directions indicated by the arrows). In this embodiment as well, the identical poles of the magnets 30*d* disposed on either side of the yoke member 20*d* face each other across the yoke member 20*d*, and as in the embodiment shown in FIGS. 10A-10C, each magnet 30*d* is pulled to the yoke member 20*d* via magnetic force. This embodiment is also similar in that the magnet unit 210*d* can be moved within the range shown in FIGS. 11A-11C through the application of currents to the electromagnetic coil unit 110*d*.

Figure 12B:
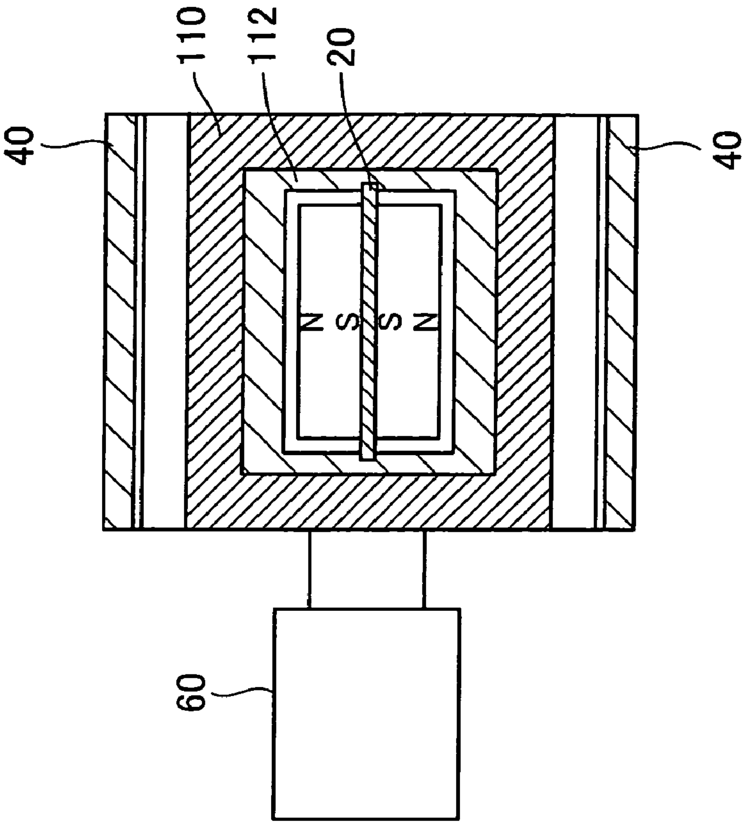
FIGS. 12A and 12B are side views of the construction of an actuator mechanism of a sixth embodiment.
Figure 12A:
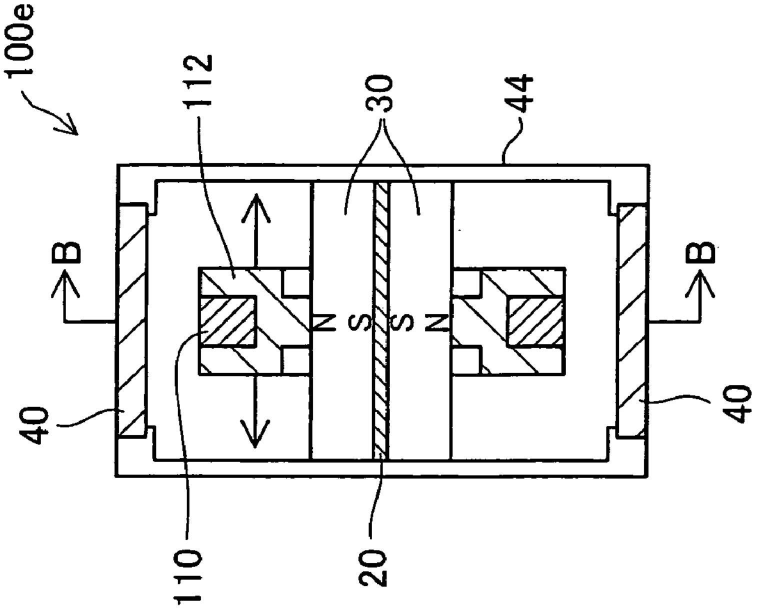

FIGS. 12A and 12B are a front view and a side view of the construction of an actuator mechanism of a sixth embodiment. This actuator mechanism 100*e* comprises the magnet unit 201 shown in FIG. 5A to which an electromagnetic coil unit 110 is added. The magnet unit and the electromagnetic coil unit are then housed in a case 44. The coil of the electromagnetic coil unit 110 is held in place by a coil holding member (coil bobbin) 112. As indicated by the arrows in FIG. 12A, in this example, the electromagnetic coil unit 110 moves laterally. As shown by FIG. 12B, a movable unit 60 is connected to the electromagnetic coil unit 110, and the movable unit 60 moves in tandem with the movement of the electromagnetic coil unit 110.

Figure 13B:
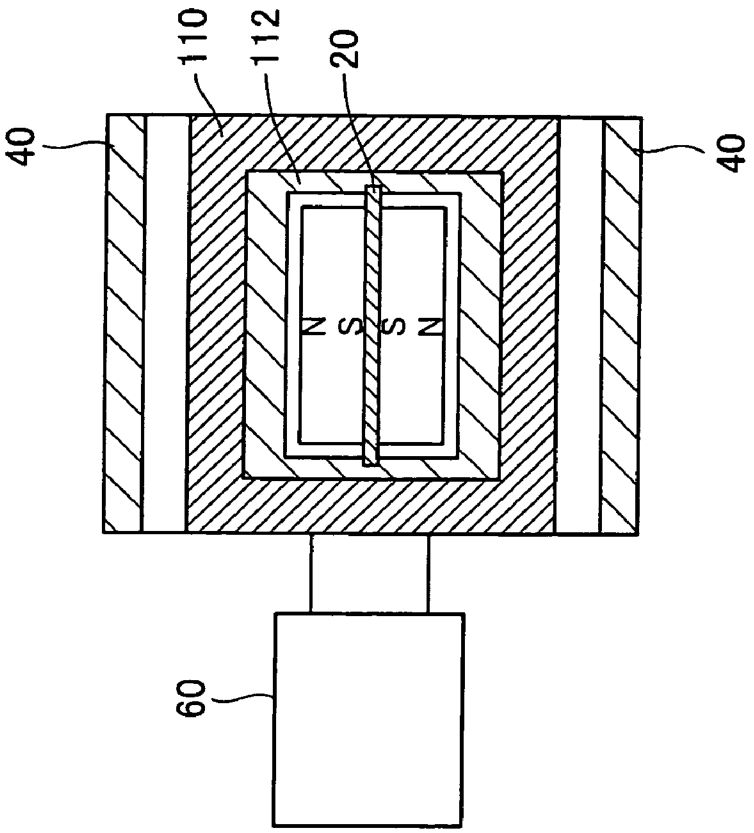
FIGS. 13A and 13B are side views of the construction of an actuator mechanism of a seventh embodiment.
Figure 13A:
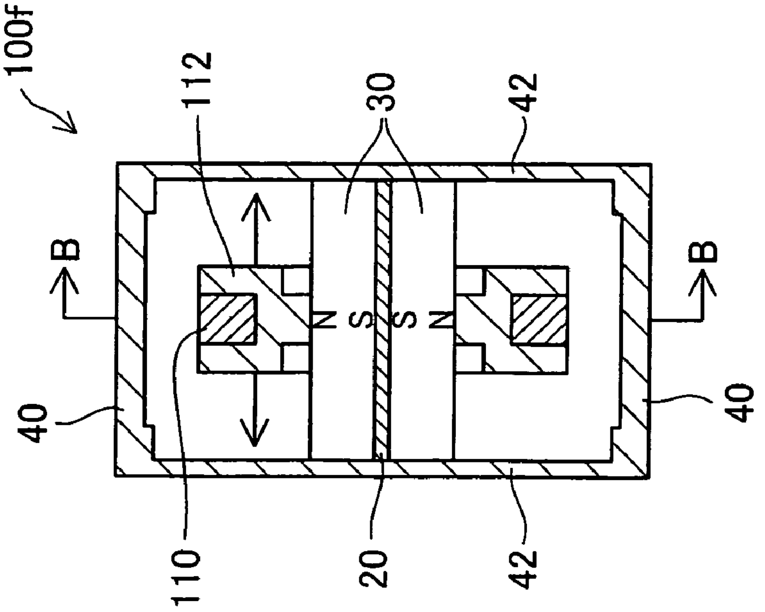

FIGS. 13A and 13B are a front view and a side view of the construction of an actuator mechanism of a seventh embodiment. This actuator mechanism 100*f* comprises the magnet unit 203 shown in FIG. 5C to which an electromagnetic coil unit 110 is added. The coil of the electromagnetic coil unit 110 is held in place by a coil holding member (coil bobbin) 112. Because the outer circumference of the magnet unit 203 of FIG. 5C is covered by yoke members 40, 42, in the example of FIG. 13, these yoke members 40, 42 also operate as a case.

Figure 14B:
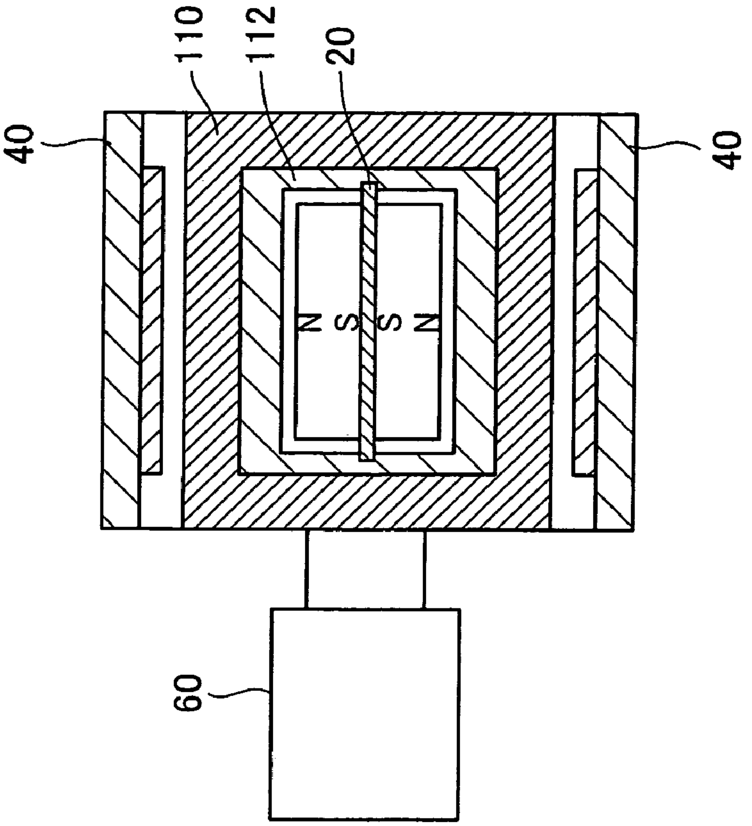
FIGS. 14A and 14B are side views of the construction of an actuator mechanism of an eighth embodiment.
Figure 14A:
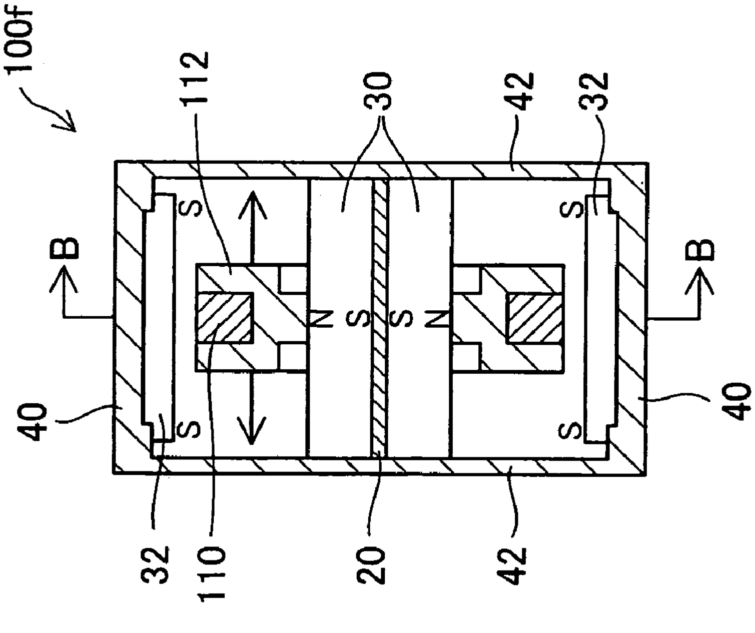

FIGS. 14A and 14B are a front view and a side view of the construction of an actuator mechanism of an eighth embodiment. This actuator mechanism 100*g* comprises the magnet unit 204 shown in FIG. 5D to which an electromagnetic coil unit 110 is added. The coil of the electromagnetic coil unit 110 is held in place by a coil holding member (coil bobbin) 112. In this example as well, the yoke members 40, 42 operate as a case.

Figure 15A:
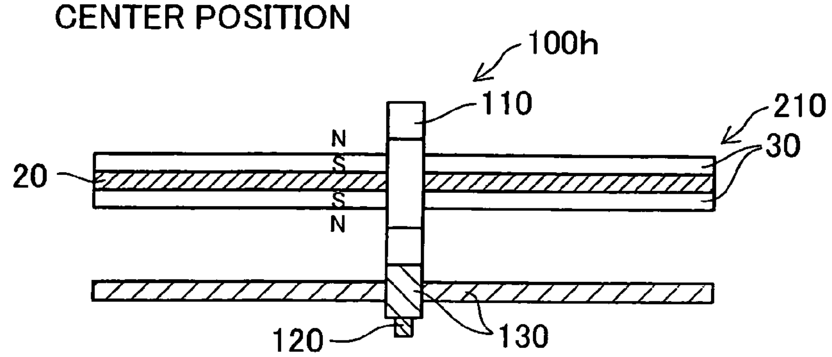
FIGS. 15A through 15E are side views of the construction of an actuator mechanism of a ninth embodiment.
Figure 15B:
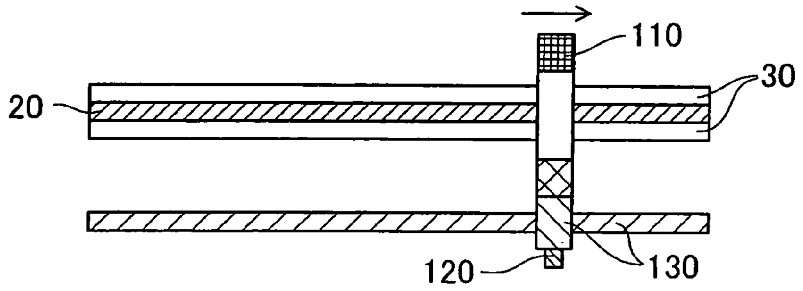
Figure 15C:
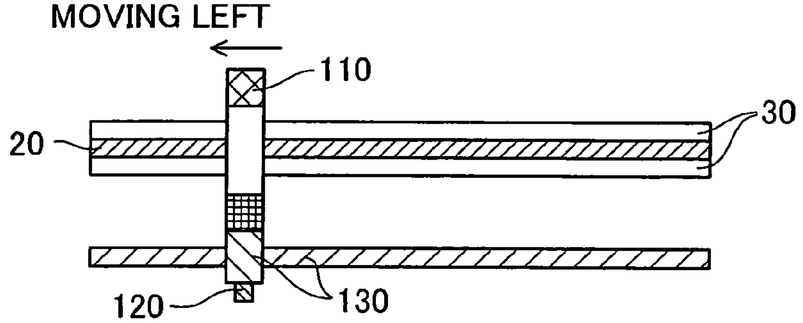
Figure 15D:
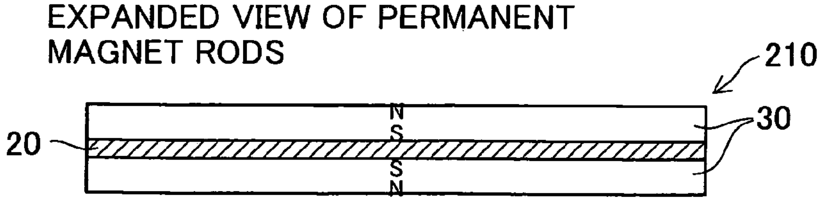
Figure 15E:
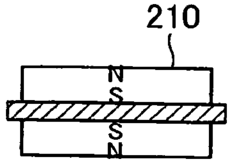

FIGS. 15A-15E are explanatory drawings showing the construction of an actuator mechanism of a ninth embodiment. FIGS. 15D and 15E are a front view and a side view of a magnet unit 210. An electromagnetic coil unit 110 is disposed around the magnet unit 210. The position of the electromagnetic coil unit 110 is detected by a central position sensor 120 and an encoder 130. FIGS. 15A and 15C show the movement of the electromagnetic coil unit 110 from the central position to the right side or the left side. Where the direction of movement is to change from the rightward to the leftward direction or vice versa, the direction of current is reversed.

As can be seen from the above descriptions, various different constructions may be adopted for the actuator mechanism. It can also be seen that the various different actuator mechanisms described above share the common feature that a plurality of magnets are pulled to a yoke member that is sandwiched by identical magnet poles that face each other across such yoke member. In addition, in these actuator mechanisms, because unnecessary force is not generated in the directions perpendicular to the direction of driving, an actuator having minimal vibration or noise can be obtained.

B. Various Embodiments of Control Devices

B-1. First Embodiment of Control Device

Figure 16:
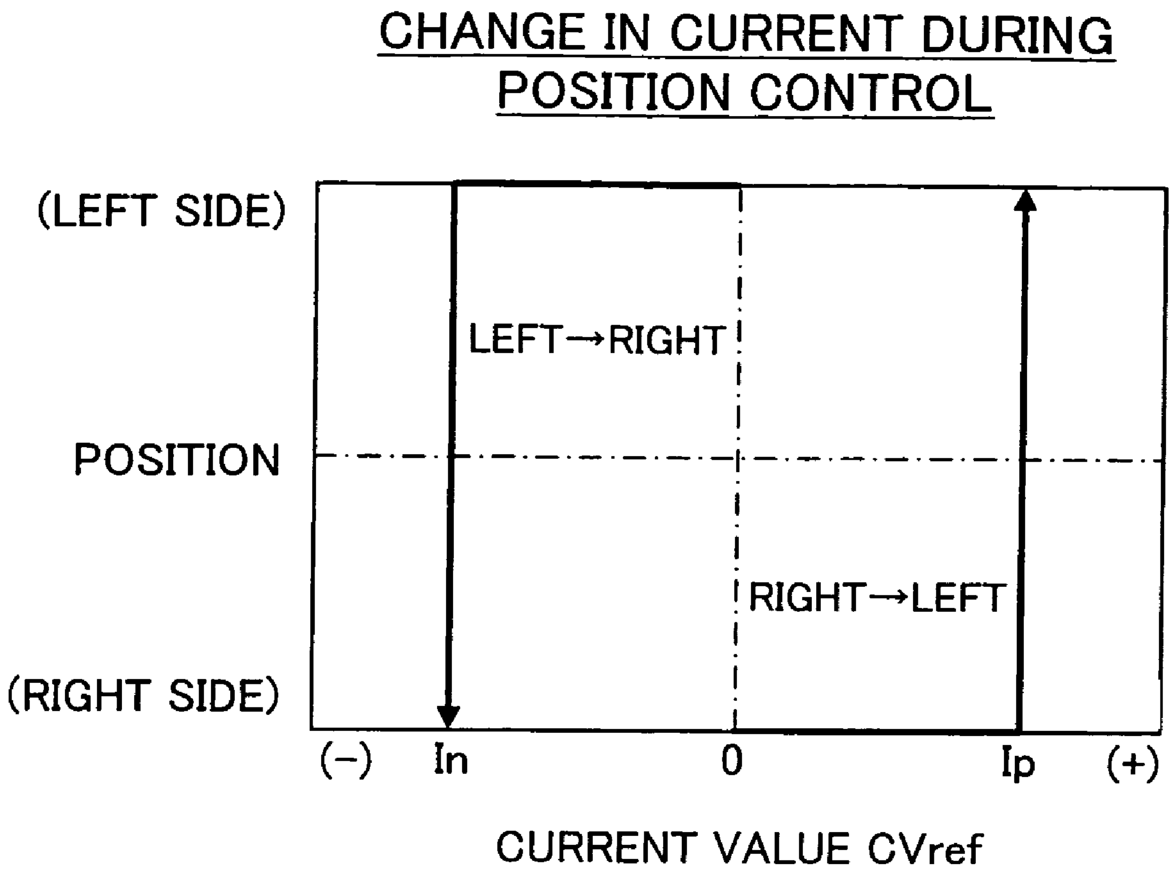
FIG. 16 is an explanatory drawing showing changes in current during position control by a control device of a first embodiment.

FIG. 16 shows a change in current during position control in connection with a first embodiment of an actuator mechanism control device. In the first embodiment, where the actuator mechanism 100 (FIGS. 4A-4C) is to be moved in the leftward direction, a constant positive current value Ip is impressed to the electromagnetic coil unit 110. Where the actuator mechanism 100 is to be moved in the rightward direction, on the other hand, a constant negative current In is impressed to the electromagnetic coil unit 110. In this way, according to the control device of the first embodiment, the controlled variable (the position of the actuator mechanism) and the manipulated variable (the current value impressed to the electromagnetic coil unit 110) are set to have a nonlinear relationship. Therefore, as described below, position control is executed using a principle different from PID control. The reason that the position and the current value are set to have a nonlinear relationship is that if they were set to have a linear relationship, when the position deviation is small, such deviation could not be brought sufficiently close to zero.

Figure 17:
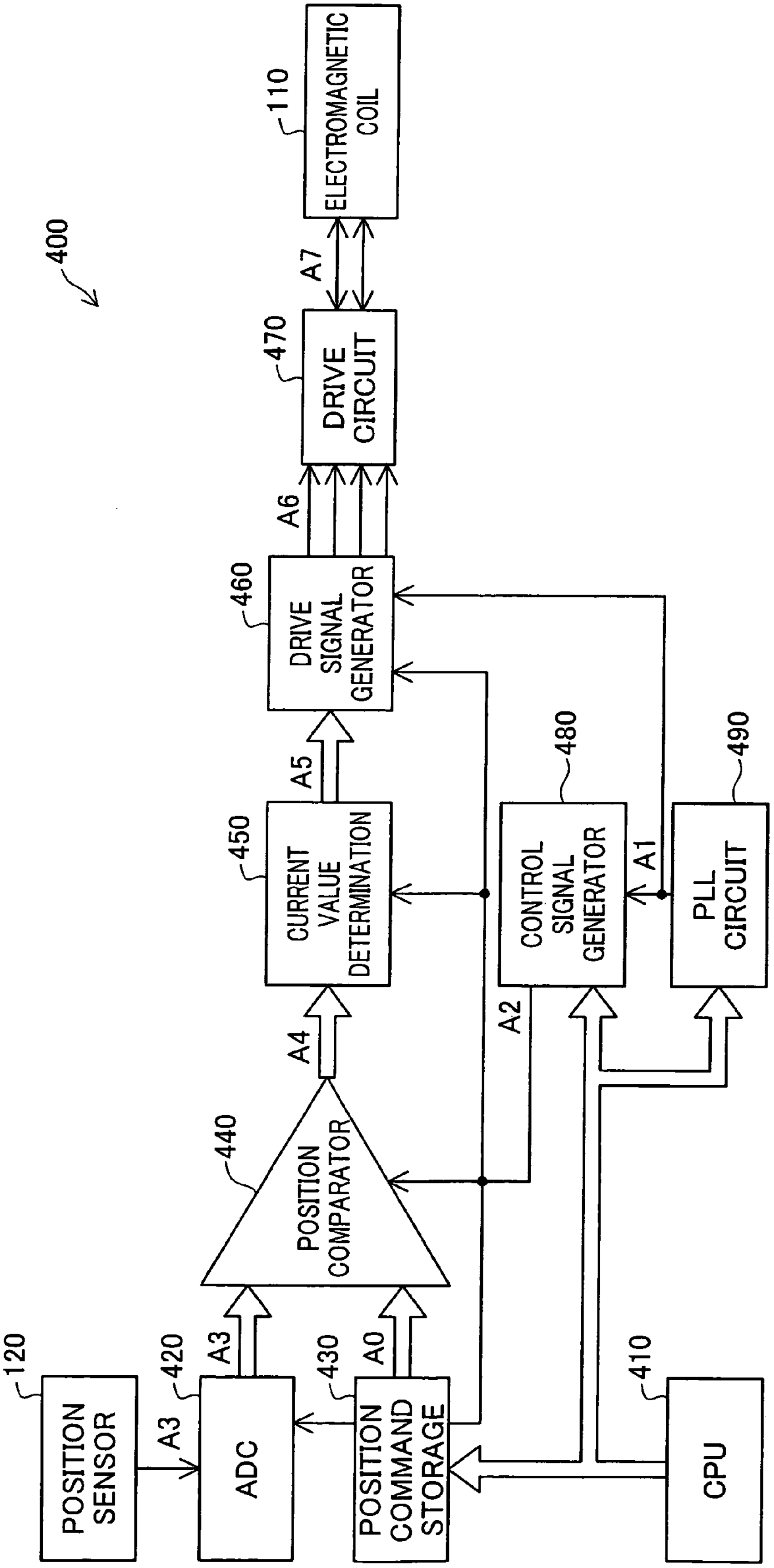
FIG. 17 is a block diagram of the control device of the first embodiment.

FIG. 17 is a block diagram of the actuator mechanism control device of the first embodiment. This control device 400 executes position control by adjusting the current value A7 impressed to the electromagnetic coil unit 110 based on a user-specified position command value A0 and a position signal A3 from the position sensor 120. When the various parameter values are set by the user, the various parameter values are registered via the CPU 410. The user operations to input the parameter values are omitted from the drawing.

Figure 18:
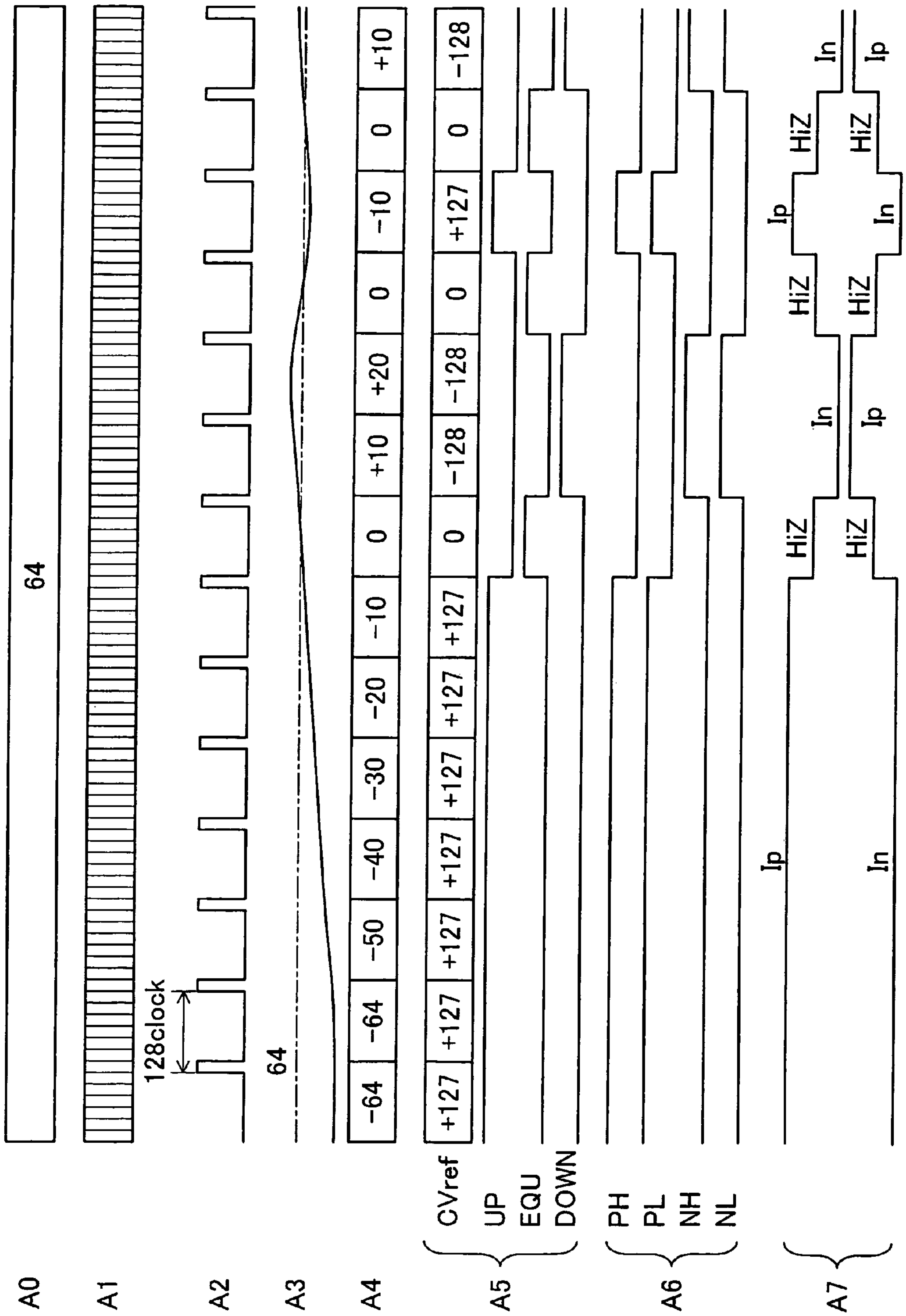
FIG. 18 is a timing chart showing the operation of the control device of the first embodiment.

FIG. 18 is a timing chart showing the operation of the control device 400. The various components of the control device 400 execute processing in synchronization with a first clock signal generated by a PLL circuit 490 and a second clock signal A2 generated by a control signal generator 480. For example, as shown in FIG. 18, each time a pulse of a second clock signal A2 is generated, the deviation A4 between the command value A0 and the position signal A3 is calculated and the current value is determined based on this deviation A4. In the example shown in FIG. 18, the second clock signal A2 pulses are generated at a ratio of $1/128^{th}$ of the first clock A1 pulses.

As shown in FIG. 17, the position signal from the position sensor 120 is converted to a digital signal by the A-D converter 420 and input to the position comparator (subtracter) 440. The user-input position command value A0 is stored in a position command storage unit 430 by the CPU 410 and supplied to the position comparator 440 from the position command storage unit 430. The position comparator 440 calculates the deviation A4 between the position signal A3 and the position command value A0, and supplies the result A4(=A3−A0) to the current value determination unit 450. In the example of FIG. 18, the deviation A4 is initially a negative value and becomes zero when the target position is reached, but thereafter fluctuates somewhat in the vicinity of zero. This is because a slight external force (such as gravity or the like) is at work. The actuator can be used as an actuator that moves at a constant speed by having the CPU 410 supply a command value in accordance with a sine wave having a fixed frequency in place of a fixed command value.

Figure 19:
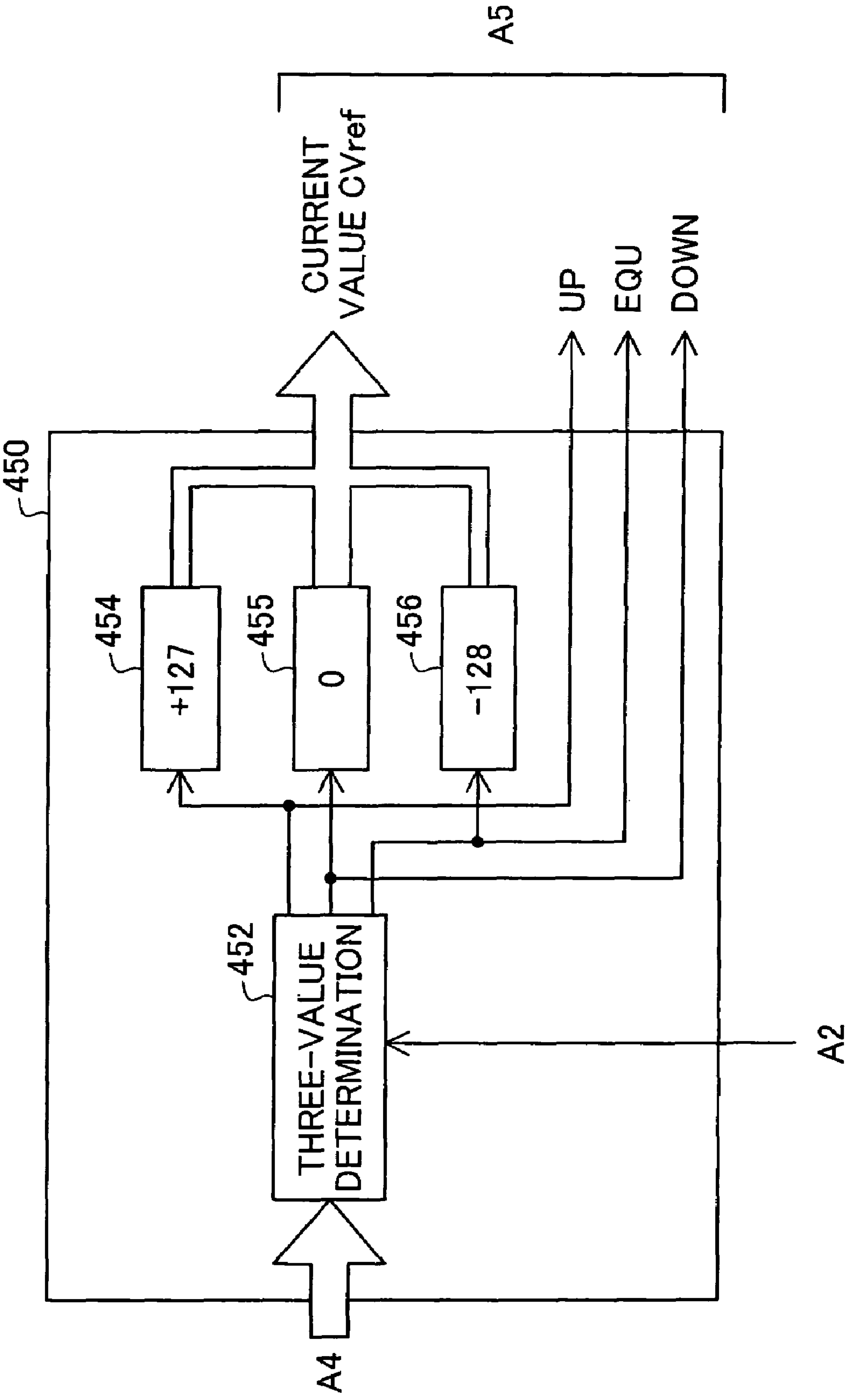
FIG. 19 is a block diagram showing the internal construction of a current value determination unit.

FIG. 19 is a block diagram showing the internal construction of a current value determination unit 450 shown in FIG. 17. The current value determination unit 450 has a three-value determination unit 452 and three reference current value registers 454-456. The three-value determination unit 452 determines whether the deviation A4 is a negative value, zero or a positive value. If the deviation A4 is a negative value, a prescribed positive reference current value CVref (=+127) is output from the first reference current value register 454. If the deviation A4 is zero, a zero current value CVref (=0) is output from the second reference current value register 455, while if the deviation A4 is a positive value, a prescribed negative reference current value CVref (=−128) is output from the third reference current value register 456. As can be seen from this description, a 'positive current value' refers to the direction of the current used to generate drive power to bring the position deviation closer to zero from a negative value. A 'negative current value' refers to the direction of the current used to generate drive power to bring the position deviation closer to zero from a positive value. The absolute values of the positive reference current value and the negative current value may be set to the same value, or may be set to be different values.

The three-value determination unit 452 also outputs three deviation sign signals UP, EQU, and DOWN to indicate whether the deviation A4 is a negative value, zero or a positive value. As shown in FIG. 18, the first deviation sign signal UP becomes H level when the deviation A4 is a negative value and becomes L level when the deviation A4 is zero or a positive value. The second deviation sign signal EQU becomes H level only when the deviation A4 is zero, and becomes L level when the deviation A4 is a negative value or a positive value. The third deviation sign signal DOWN becomes H level when the deviation A4 is a positive value and becomes L level when the deviation A4 is zero or a negative value. The signals A5 generated by the current value determination unit 450 (the reference current value CVref and the deviation sign signal UP, EQU and DOWN) are supplied to a rive signal generator 460 shown in FIG. 17.

Figure 20:
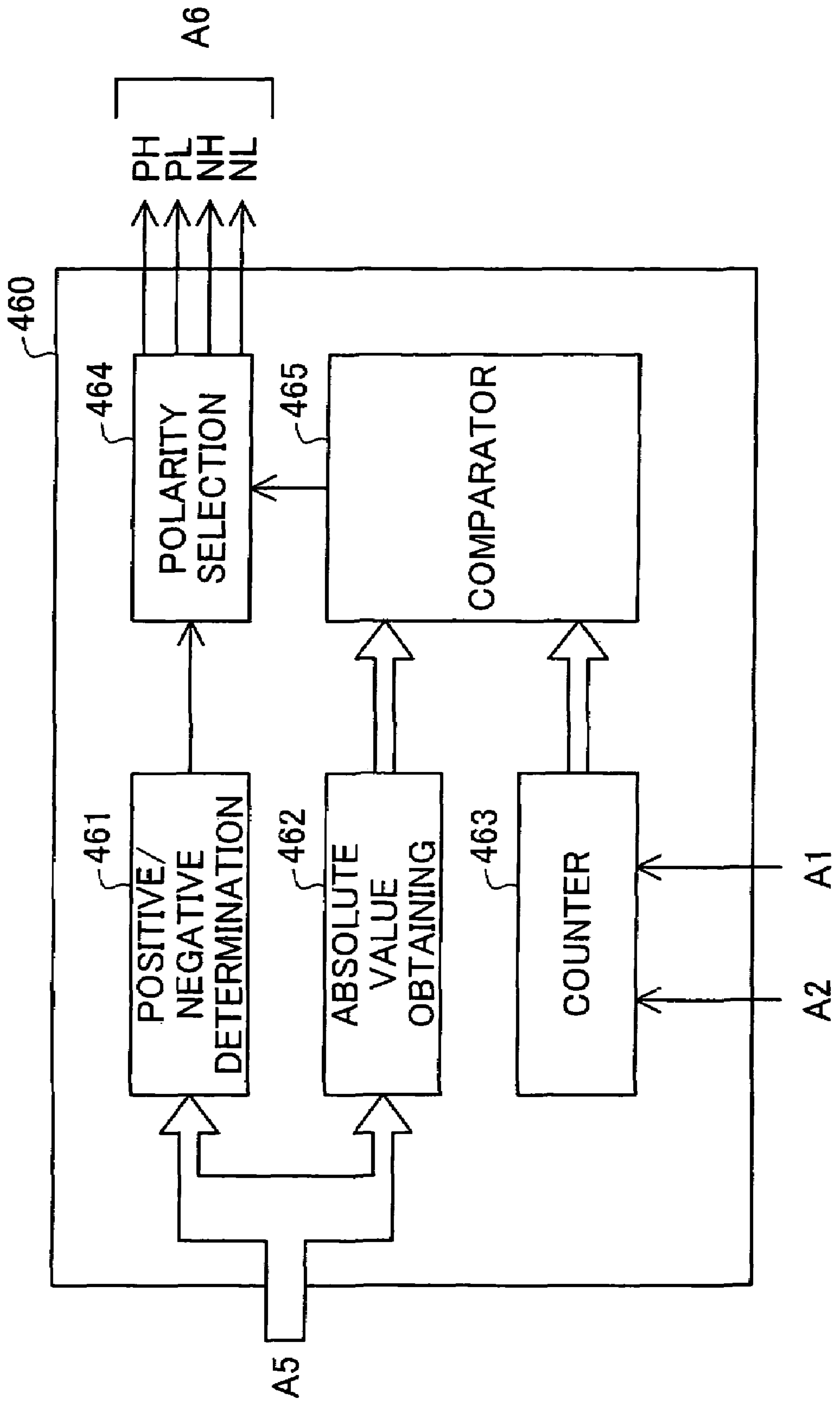
FIG. 20 is a block diagram showing the internal construction of a drive signal generator.

FIG. 20 is a block diagram showing the internal construction of the drive signal generator 460. The drive signal generator 460 has a positive/negative determination unit 461, an absolute value obtaining unit 462, a counter 463, a pole selection unit 464 and a comparator 465. The positive/negative determination unit 461 determines the sign for the reference current value CVref (positive, zero or negative) and the absolute value obtaining unit 462 obtains the absolute value of the reference current value CVref and supplies it to the comparator 465. The counter 463 counts the number of pulses of the first clock Al and supplies this number to the comparator 465. The count value obtained by the counter 463 is reset to zero in response to a pulse of the second clock A2. Therefore, the counter 463 repeatedly generates count values from 0 to 127.

The pole selection unit 464 generates two sets of drive signals (PH, PL) and (NH, NL) based on signals from the positive/negative determination unit 461 and the comparator 465. These two sets of drive signals (PH, PL) and (NH, NL) are signals supplied to the gates of the four transistors of an H bridge circuit in a drive circuit unit 470 shown in FIG. 17. The first set of drive signals (PH, PL) are maintained at H level when the reference current value CVref is a positive value but only until the count value of the counter 463 reaches a pulse count equal to the absolute value of the reference current value CVref, while these drive signals (PH, PL) are otherwise set to L level. On the other hand, the second set of drive signals (NH, NL) are maintained at H level when the reference current value CVref is a negative value but only until the count value of the counter 463 reaches a pulse count equal to the absolute value of the reference current value CVref, while these drive signals (NH, NL) are otherwise set to L level. When the reference current value CVref is zero, the two sets of drive signals (PH, PL) and (NH, NL) are maintained at L level. The drive signals A6 that include the two sets of drive signals (PH, PL) and (NH, NL) obtained in this fashion are supplied to the drive circuit unit 470.

As can be seen from FIG. 18, in the control device of the first embodiment, the first set of drive signals (PH, PL) have a waveform identical to that of the first deviation sign signal UP generated by the current value determination unit 450. Similarly, the second set of drive signals (NH, NL) have a waveform identical to that of the third deviation sign signal DOWN. Therefore, in the first embodiment, the drive signal generator 460 can be omitted.

Figure 21:
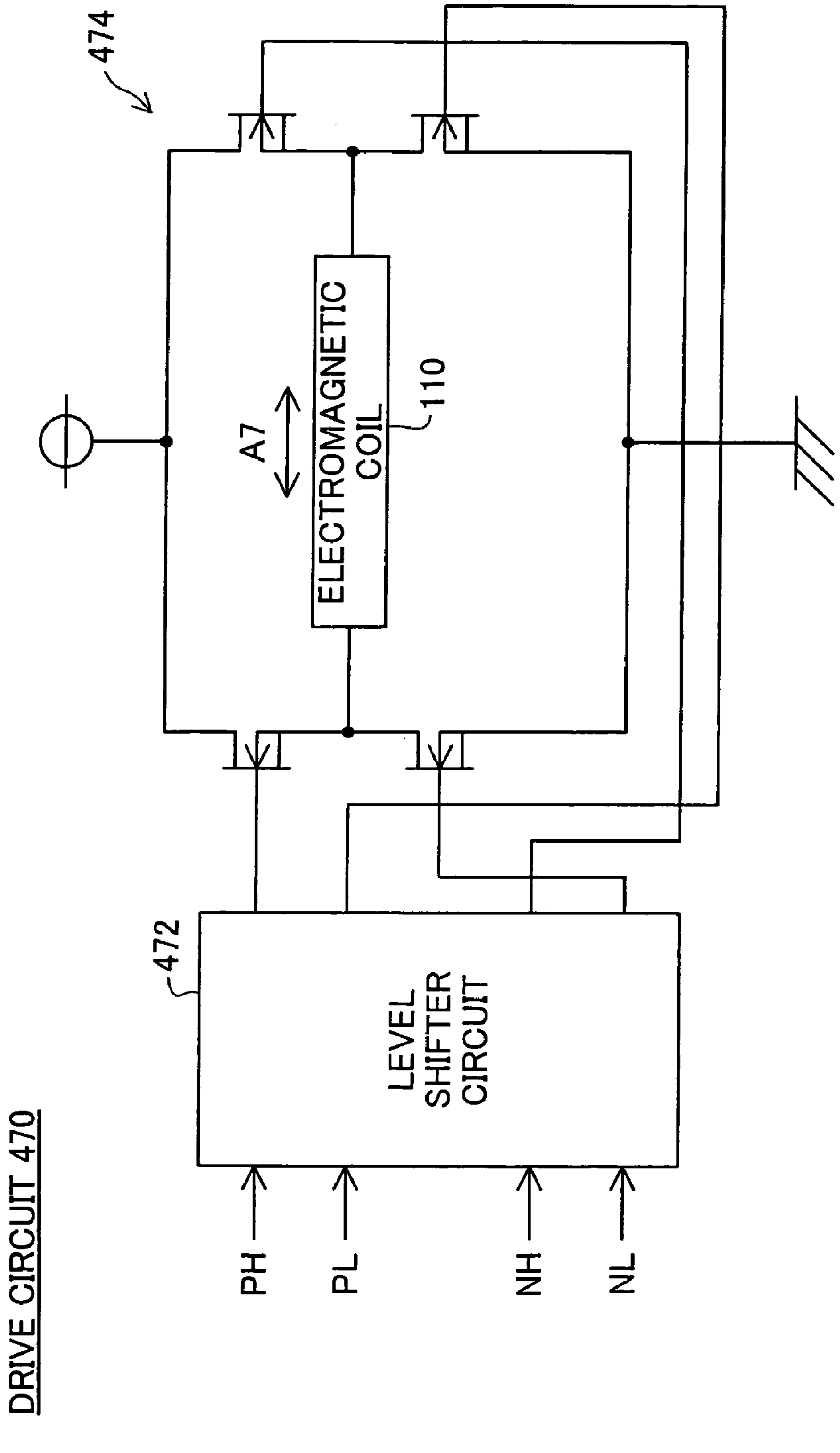
FIG. 21 is an explanatory drawing showing the internal construction of a drive circuit unit.

FIG. 21 shows the internal construction of the drive circuit unit 470. The drive circuit unit 470 has a level shifter circuit 472 and an H-bridge circuit 474. The level shifter circuit 472 has the function of increasing the voltage level of the two sets of drive signals (PH, PL) and (NH, NL) to a voltage level appropriate for the gate voltage of the transistors of the H-bridge circuit 474. The two sets of drive signals (PH, PL) and (NH, NL) for which the voltage level is adjusted in this way are impressed to the gates of the four transistors of the H-bridge circuit unit 474, in response to which current A7 flows to the electromagnetic coil unit 110. This coil current A7 has one of the following values: the positive reference current value Ip, zero or the negative reference current value In as shown in FIG. 16. The positive reference current value Ip and the negative reference current value In correspond to the reference current values CVref determined by the current value determination unit 450 (FIG. 19). In FIG. 18, the letters "HiZ" indicating a high impedance state are shown for periods during which the coil current A7 is zero.

As described above, in the first embodiment, the reference current value CVref is set to a prescribed positive value, zero or a prescribed negative value in response to whether the deviation A4 between the target value (command value) and the measured value regarding the position is a negative value, zero or a positive negative value, and coil current A7 corresponding to this reference current value CVref is impressed to the electromagnetic coil unit 110. Therefore, despite the fact that the controlled variable (position) and the manipulated variable (current) have a nonlinear relationship as shown in FIG. 16, the actuator will be positioned at a desired position.

In addition, because the current value for the electromagnetic coil unit 110 is determined by a digital circuit, it is much easier to employ an integrated circuit than it would be if an analog circuit were used. Using an integrated circuit is for the control device offers the advantages that not only can the component cost be reduced, but variations in the operation that are attributable to changes in components and temperature fluctuations can be reduced.

B-2. Second Embodiment of Control Device

Figure 22:
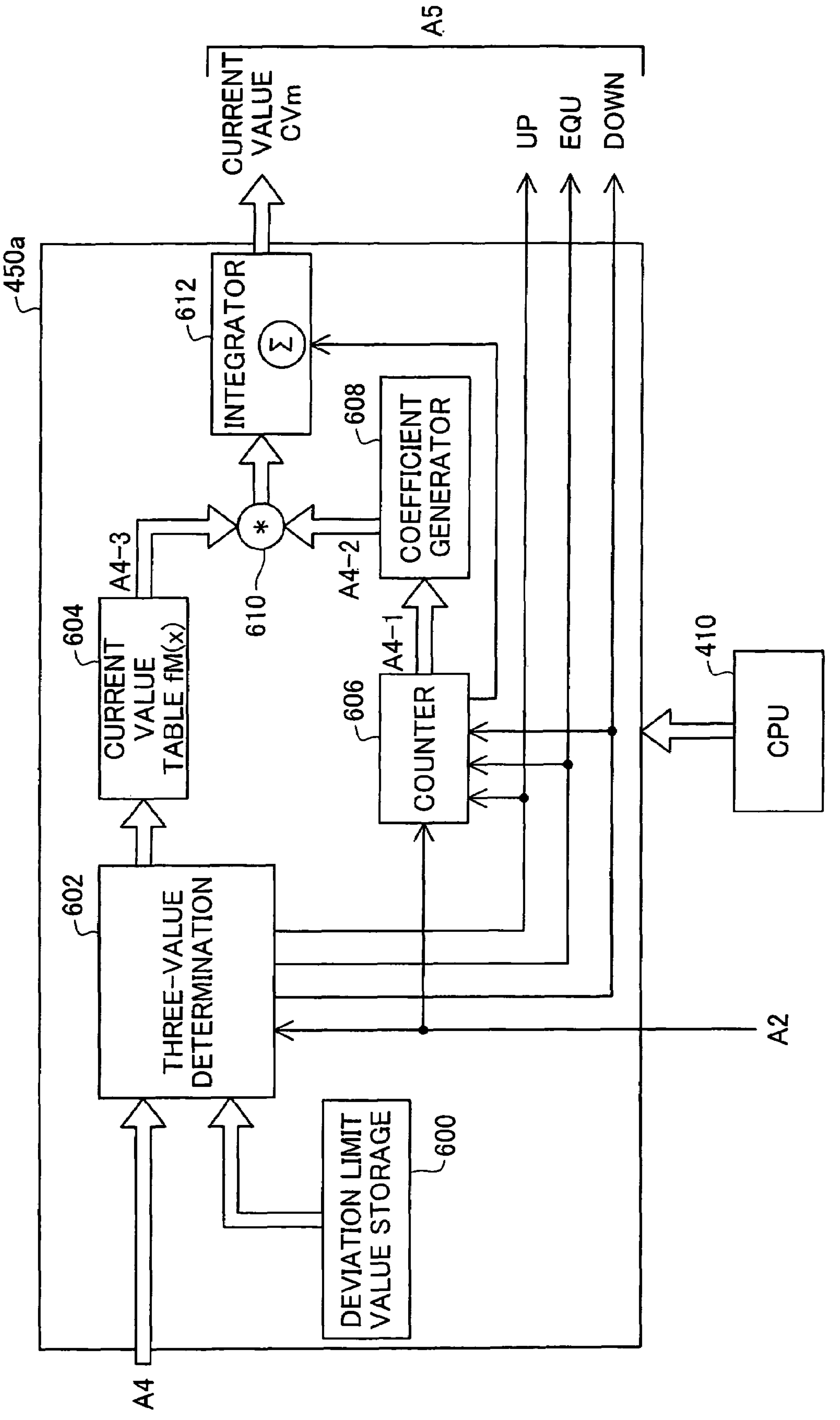
FIG. 22 is a block diagram showing the internal construction of a current value determination unit of a second embodiment.
Figure 23:
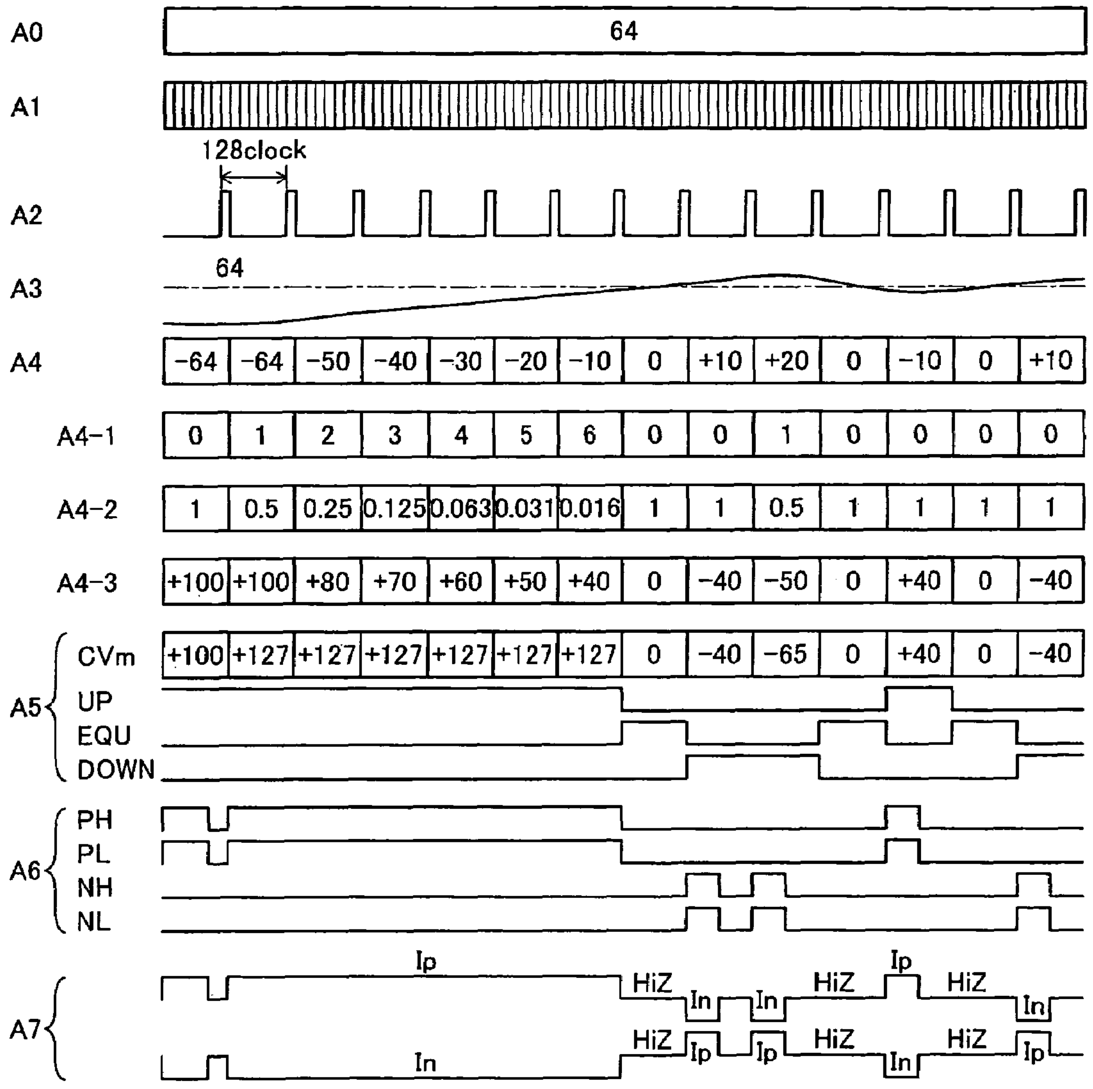
FIG. 23 is a timing chart showing the operation of a control device of a second embodiment.

FIG. 22 is a block diagram showing the internal construction of a current value determination unit 450*a* of a second embodiment. FIG. 23 is a timing chart showing the operation of the control device of the second embodiment. The construction of the second embodiment differs from that of the first embodiment solely in regard to the construction of the current determination unit, and is otherwise identical thereto.

This current value determination unit 450*a* has a deviation limit value storage unit 600, a three-value determination unit 602, a current value table 604, a counter 606, a coefficient generator 608, a multiplier 610 and an integrator (accumulator) 612. The three-value determination unit 602, like the three-value determination unit 452 shown in FIG. 19, outputs three deviation sign signals UP, EQU and DOWN, and supplies the deviation A4 to the current value table 604. The three-value determination unit 602 also has the function of clipping the deviation A4 to the upper or lower limit value where the input deviation A4 exceeds either the upper limit or lower limit stored in advance in the deviation limit value storage unit 600. This is carried out in order to harmonize the range of the deviation A4 with the input range for the current value table 604. The current value table 604 is a table that outputs the reference current value A4-3 in accordance with the deviation A4 output from the three-value determination unit 602.

Figure 24:
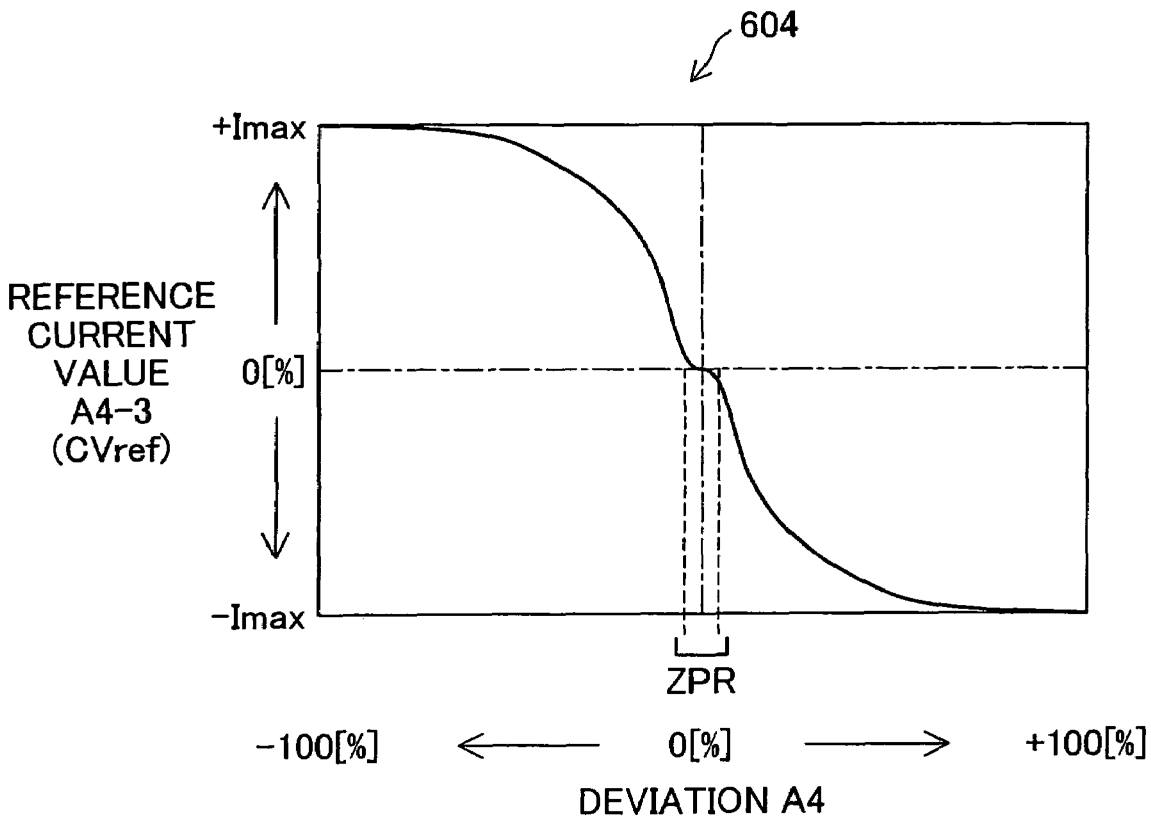
FIG. 24 is a graph showing the contents of a current value table.

FIG. 24 is a graph showing the contents of the current value table 604. The horizontal axis represents the deviation A4, while the vertical axis represents the reference current value A4-3. The reference current value A4-3 corresponds to the reference current value CVref used by the current value determination unit 450 of the first embodiment (FIG. 19). However, in the second embodiment, the reference current value A4-3 is not a fixed value, and changes along a curved slope in accordance with the deviation A4. However, in the zero proximity range ZPR in which the deviation A4 is close to zero, the reference current value A4-3 is maintained at zero. This zero proximity range ZPR is set to a range corresponding to the margin of error for positioning accuracy. The reference current value A4-3 output from the current value table 604 is supplied to the multiplier 610.

The counter 606 counts the number of the clock signal A2 pulses while the deviation A4 is maintained at the same sign (positive or negative) in accordance with the three deviation sign signals UP, EQU and DOWN, and outputs a count value A4-1. This count value A4-1 represents the number of continuous occurrences of a deviation A4 having the same sign, and is reset to zero if the deviation A4 becomes zero or if the sign of the deviation A4 changes (see FIG. 23). This count value A4-1 is also termed the 'number of continuous same-sign occurrences'. The count value A4-1 is supplied to the coefficient generator 608.

The coefficient generator 608 outputs a coefficient A4-2 that decreases in size as the number of continuous same-sign occurrences A4-1 increases. Specifically, as shown in FIG. 23, the coefficient A4-2 starts at 1 and takes a value that is obtained by sequentially multiplying the preceding value by ½, (i.e., 1, 0.5, 0.25, 0.125 . . . ). When the number of same-sign occurrences A4-1 becomes zero, the coefficient A4-2 is initialized to 1. However, the method for reducing the coefficient A4-2 may be set in some other way. This coefficient A4-2 is multiplied by the reference current value A4-3 in the multiplier 610, and the results of this multiplication are totaled by the integrator 612. An upper limit value (+127) and lower limit value (−128) are preset in the integrator 612, and the accumulation result CVm is clipped to fall within these limits. The output CVm from the integrator 612 is used as a current value supplied to the electromagnetic coil. This current value CVm and the three deviation sign signals UP, EQU and DOWN are output from the current value determination unit 450*a* and supplied to the drive signal generator 460 (FIG. 17).

The operation of the drive signal generator 460 is the same as the operation described in the first embodiment. However, as can be seen from a comparison of FIGS. 18 and 23, among the signals A5 input to the drive signal generator 460, while the current value CVref of the first embodiment was one of three reference current values (+127, 0, −128), the current value CVm of the second embodiment varies among a greater number of values. As a result, the two sets of drive signals (PH, PL) and (NH, NL) generated by the drive signal generator 460 are different from those shown in FIG. 18. In other words, the first set of drive signals (PH, PL) is maintained at H level when the current value CVm is positive but only until the count value counted by the counter 463 (FIG. 20) reaches the value equal to the absolute value of the current value CVm, and is set to L level otherwise. At the same time, the second set of drive signals (NH, NL) is maintained at H level when the current value CVm is negative but only until the count value counted by the counter 463 reaches the value equal to the absolute value of the current value CVm, and is set to L level otherwise. As a result, the two sets of drive signals (PH, PL) and (NH, NL) are signals that become H level signals only during a period whose length corresponds to the current value CVm. In addition, the current A7 supplied to the electromagnetic coil becomes the fixed current value Ip or In only during the periods corresponding to the waveforms of the two sets of drive signals (PH, PL) and (NH, NL). Therefore, it can be seen that the effective value of the current A7 flowing in the electromagnetic coil (i.e., the effective amount of electric power) corresponds to the current value CVm.

As described above, in the second embodiment, where a deviation A4 having the same sign occurs continuously, a gradually declining coefficient A4-2 is generated, this coefficient A4-2 is multiplied by the reference current value A4-3 determined in response to the deviation A4, the results of the multiplication are accumulated, and the electromagnetic coil is driven by a current equivalent to the value Cvm resulting from this accumulation. As a result, when the sign for the deviation A4 changes at a position near zero, an excessive change in position will be prevented by gradually increasing the absolute value of the current value CVm. Specifically, with reference to FIG. 23, when the sign of the deviation A4 changes from zero to a plus sign, the current value CVm changes gradually from zero to −40 and to −65. On the other hand, in the first embodiment shown in FIG. 18, the current value CVref for these timings is −128 and −128, showing the absolute value of the current value to be larger than in the second embodiment. Therefore, in the second embodiment, the possibility that excessive positional change will occur in the range in which the deviation A4 is close to zero is smaller than in the first embodiment, and therefore the advantage of better positioning control accuracy is obtained.

B-3. Third Embodiment of Control Device

Figure 25:
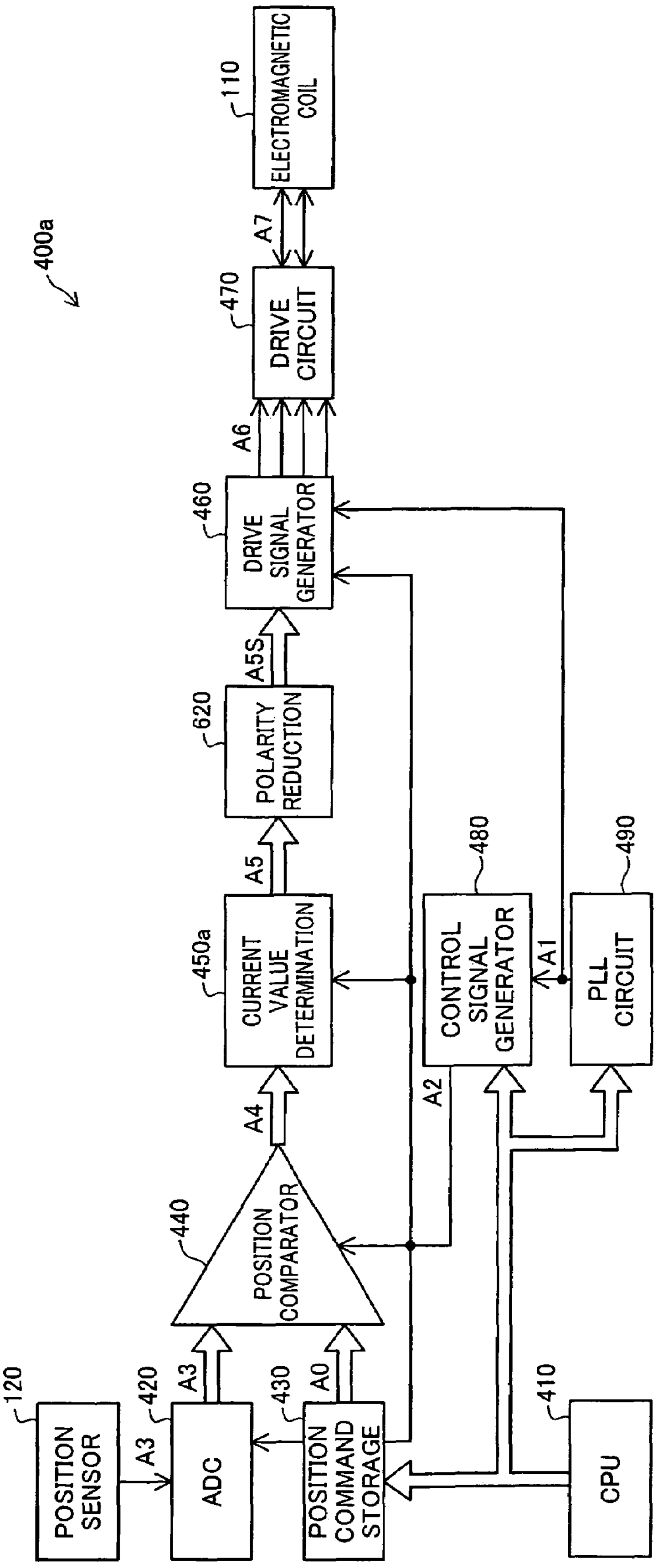
FIG. 25 is a block diagram showing the construction of a control device of a third embodiment.
Figure 26:
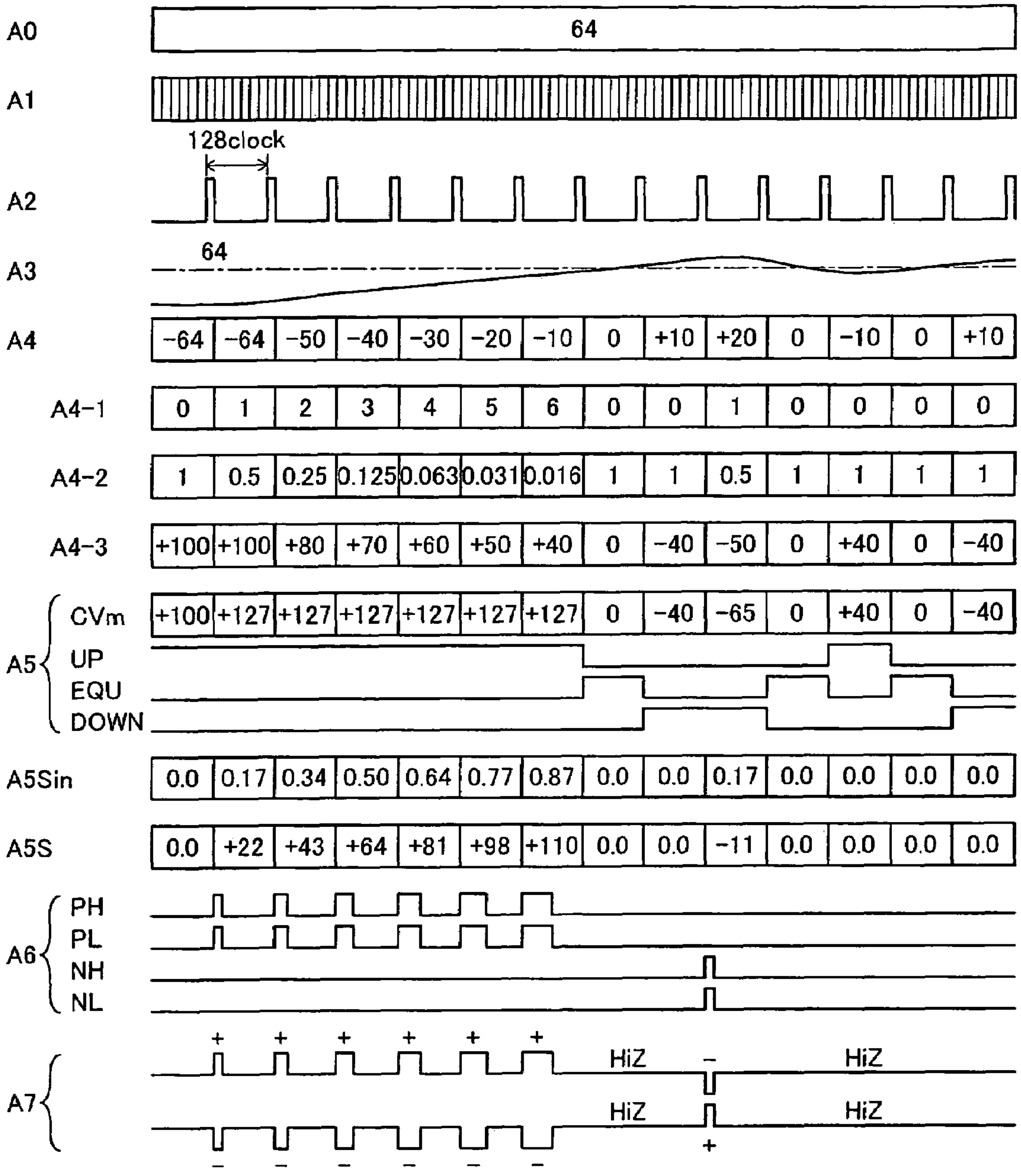
FIG. 26 is a timing chart showing the operation of the control device of the third embodiment.

FIG. 25 is a block diagram showing the construction of a control device of a third embodiment. FIG. 26 is a timing chart pertaining to the operation of the control device of the third embodiment. This control device 400*a* differs from the control device of the first embodiment (FIG. 17) in that it has the current value determination unit 450*a* of the second embodiment (FIG. 22) in place of the current value determination unit 450 (FIG. 17), and includes a polarity reduction unit 620 between the current value determination unit 450*a* and the drive signal generator 460. In other words, the control device of the third embodiment comprises the control device of the second embodiment to which a polarity reduction unit 620 is added.

Figure 27:
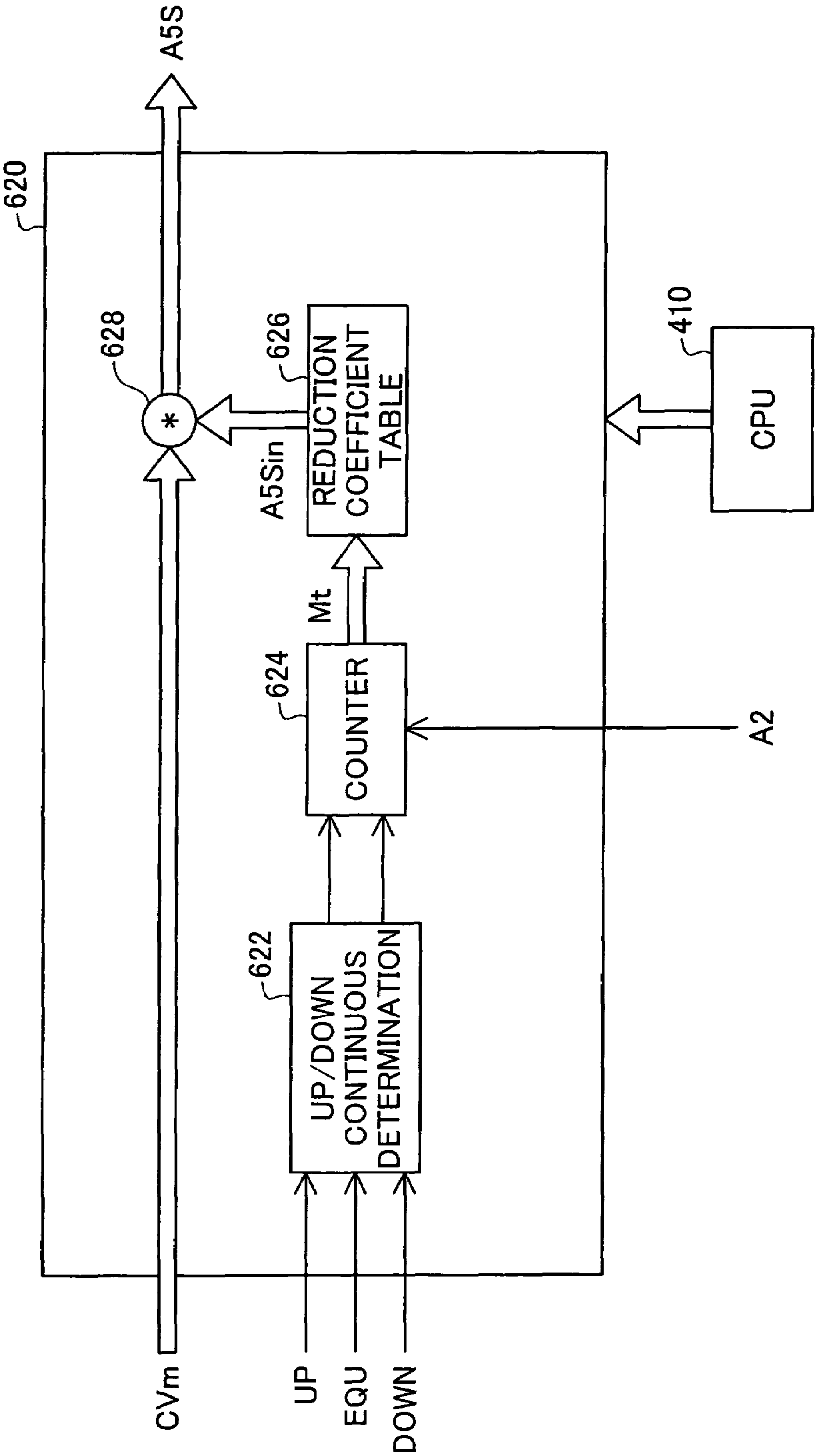
FIG. 27 is a block diagram showing the internal construction of a polarity reduction unit.

FIG. 27 is a block diagram showing the internal construction of the polarity reduction unit 620. The polarity reduction unit 620 has an up/down continuous determination unit 622, a counter 624 and a reduction coefficient table 626. The up/down continuous determination unit 622, like the counter 606 of the current value determination unit 450*a* (FIG. 22), counts the number of continuous occurrences Mt of the same sign (positive or negative) in response to the three deviation sign signals UP, EQU and DOWN. Therefore, the value obtained for this number of continuous occurrences Mt is the same value as that of the number of continuous same-sign occurrences A4-3 generated by the counter 606 of the current determination unit 450*a*. The reduction coefficient table 626 outputs a reduction coefficient or mitigated coefficient A5 Sin in response to this number of continuous occurrences Mt. This reduction coefficient A5 Sin is derived, for example, using the equation $$A5\ \mathrm{Sin}=\sin(Mt/k)$$

where k is a constant that is set to k=6 in the example shown in FIG. 26.

For the reduction coefficient A5Sin, any coefficient that increases as the number of continuous same-sign occurrences Mt increases may be used. However, it is preferred that the value of the reduction coefficient A5 Sin falls between 0 and 1.

The multiplier 628 multiplies the reduction coefficient A5 Sin by the current value CVm and supplies the product A5S to the drive signal generator 460 as the final current value. As can be seen from FIG. 26, this current value A5S gradually increases in value while the sign of the deviation A4 remains the same. The electromagnetic coil is driven by a current corresponding to this current value A5S.

As described above, in the third embodiment, the coil current value is determined such that the coil current increases gradually while the sign of the deviation A4 remains the same. Therefore, in addition to achieving the effects of the second embodiment, the third embodiment also achieves the effect of enabling control to be performed such that the coil current value increases steadily after the sign of the deviation A4 changes from positive to negative or from negative to positive. In other words, the danger of an excessive change in position occurring when there is a change in the sign of the deviation A4 will be reduced.

C. Application Examples of Actuator

Figure 28A:
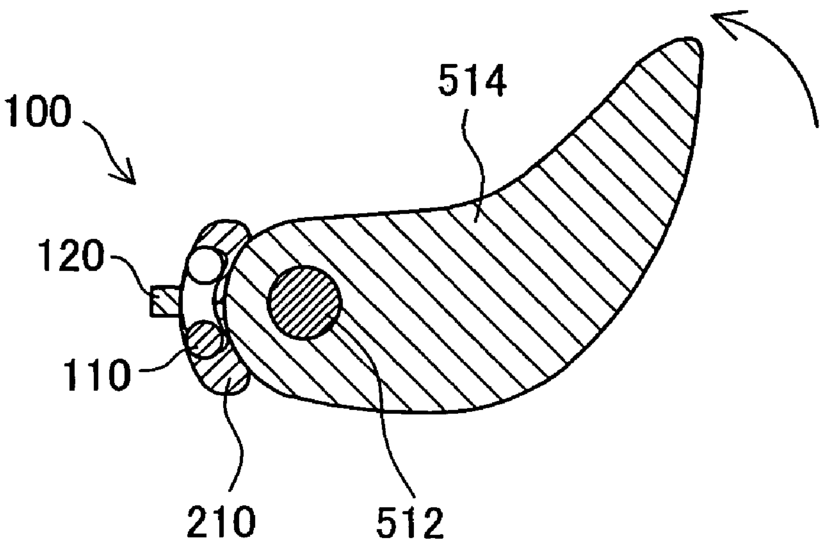
FIGS. 28A and 28B are explanatory drawings showing a first application example of an actuator according to an embodiment of the present invention.
Figure 28B:
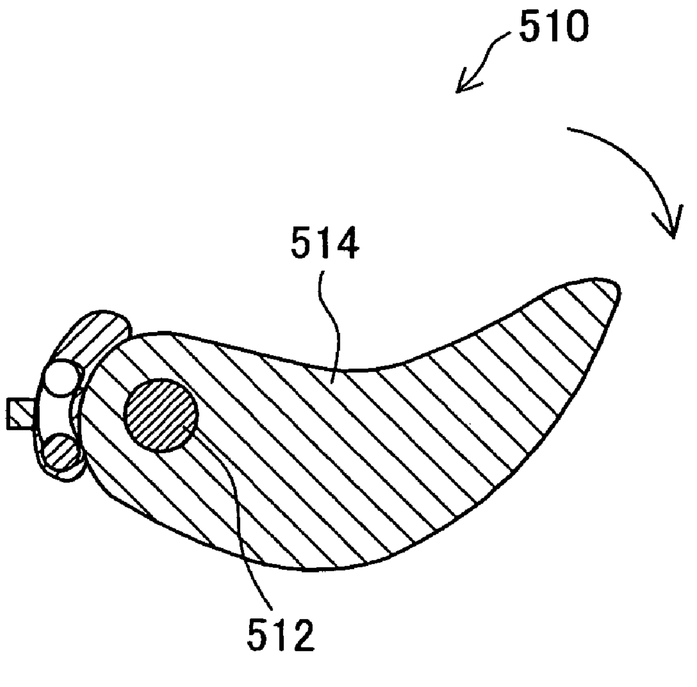

FIGS. 28A and 28B are explanatory drawings showing a blade member drive mechanism comprising a first application example of an actuator according to an embodiment of the present invention. This blade member drive mechanism 510 includes a revolving blade member 514 that can turn around a central shaft 512 and an actuator mechanism 100 that moves this blade member 514. This actuator mechanism 100 comprises the mechanism shown in FIGS. 10A-10C modified to have a curved configuration. The magnet unit 210 of the actuator mechanism 100 is secured to one end of the blade member 514, and the electromagnetic coil unit 110 is secured to a support member not shown. The electromagnetic coil unit 110 and the magnet unit 210 are positioned on the circumference of a circle that is formed with the central shaft 512 as its center. When the actuator mechanism 100 is operated, the blade mechanism 514 turns around the central shaft 512. Because the actuator mechanism 100 can be position-controlled, the blade mechanism 514 can be positioned at a desired position. In this application, the term 'position' indicates the rotational angle of the blade mechanism 514. By using several blade mechanisms 514, an aperture mechanism for an optical device can be formed.

Figure 29A:
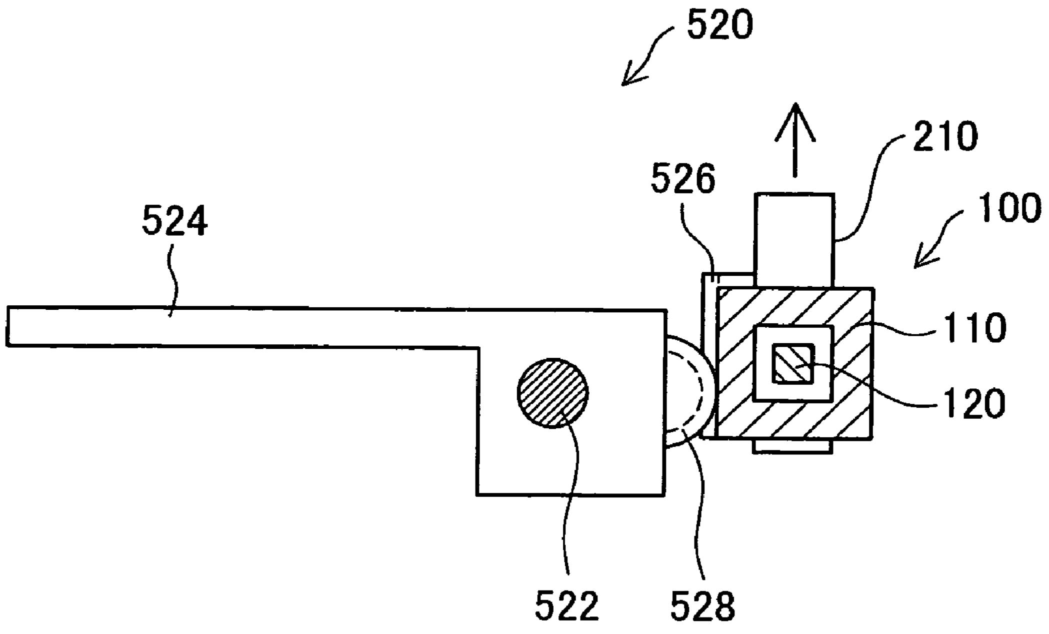
FIGS. 29A and 29B are explanatory drawings showing a second application example of an actuator according to an embodiment of the present invention.
Figure 29B:
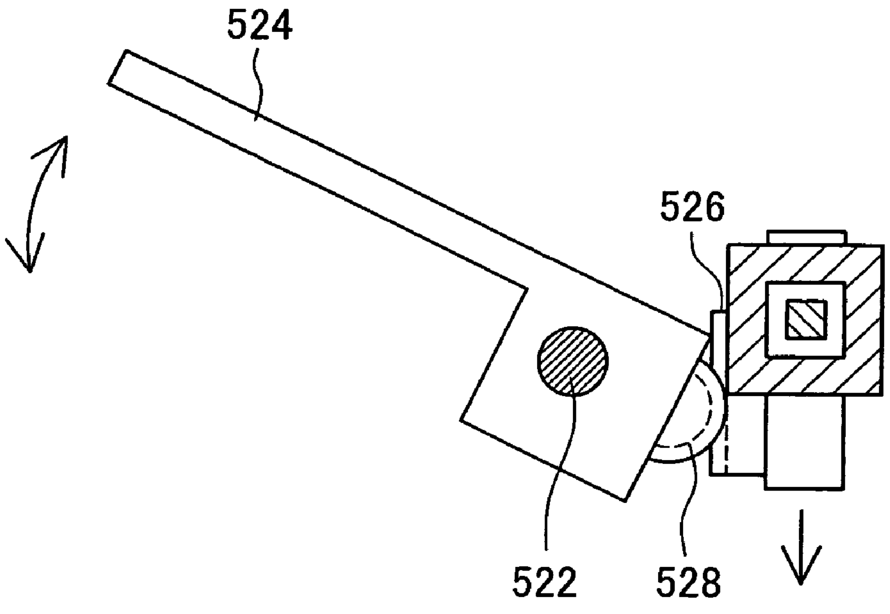

FIGS. 29A and 29B are explanatory drawings showing a lever drive mechanism comprising a second application example of an actuator according to an embodiment of the present invention. This lever drive mechanism 520 includes a revolving lever 524 that can turn around a central shaft 522 and an actuator 100 that moves this lever 524. Mutually engaging gears 526, 528 are secured at the locations at which the magnet unit 210 of the actuator mechanism 100 and the lever 524 face each other. One gear 526 comprises a spur gear and the other gear 528 comprises a semicircular gear. The electromagnetic coil unit 110 is secured to a support member not shown. The linear movement of the actuator mechanism 100 is converted into rotational motion by the gears 526, 528. When the actuator mechanism 100 is operated, the lever 524 turns around the central shaft 522. As a result, the lever 524 can be positioned at a desired position.

Figure 30:
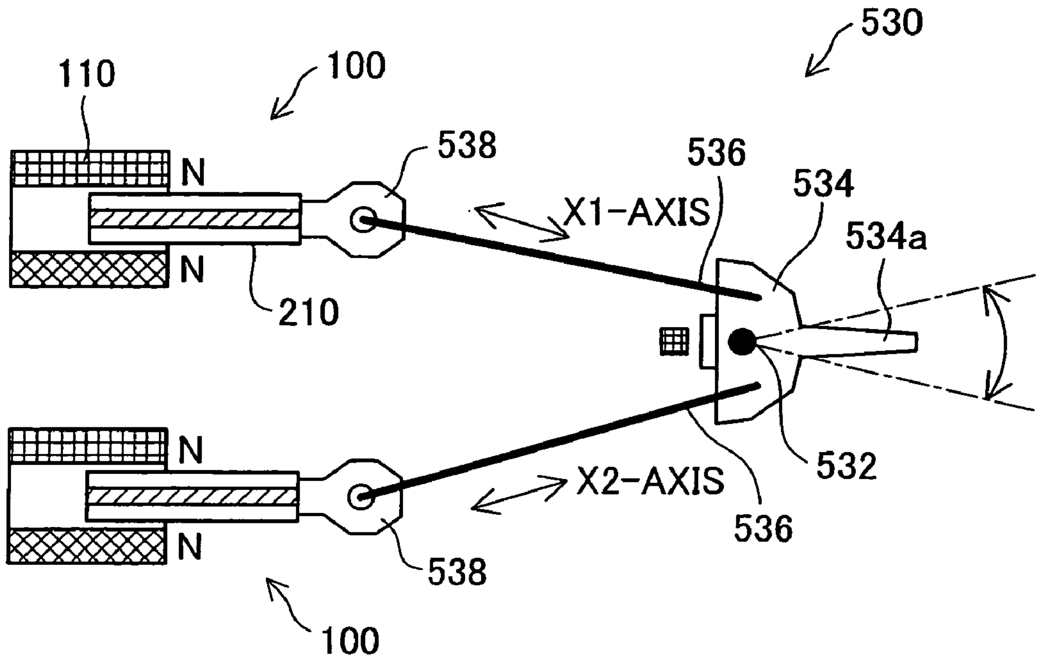
FIG. 30 is an explanatory drawing showing a third application example of an actuator according to an embodiment of the present invention.

FIG. 30 is an explanatory drawing showing a protrusion member drive mechanism comprising a third application example of an actuator according to an embodiment of the present invention. This protrusion member drive mechanism 530 includes a revolving protrusion member 534 that can turn around a central shaft 532 and two actuator mechanisms 100 that move this protrusion member 534. A link securing member 538 is secured to one end of the magnet unit 210 of each actuator mechanism 100. The electromagnetic coil units 110 are secured to support members not shown. The two link securing members 538 are respectively connected to the protrusion member 534 by two linear links 536 disposed on the same plane (the two links 536 comprising X1 and X2 axes). When the two actuator mechanisms 100 are operated, the protrusion member 534 turns around the central shaft 532. As a result, the protrusion 534*a* disposed at the distal end of the protrusion member 534 can be positioned at a desired angle.

Figure 31:
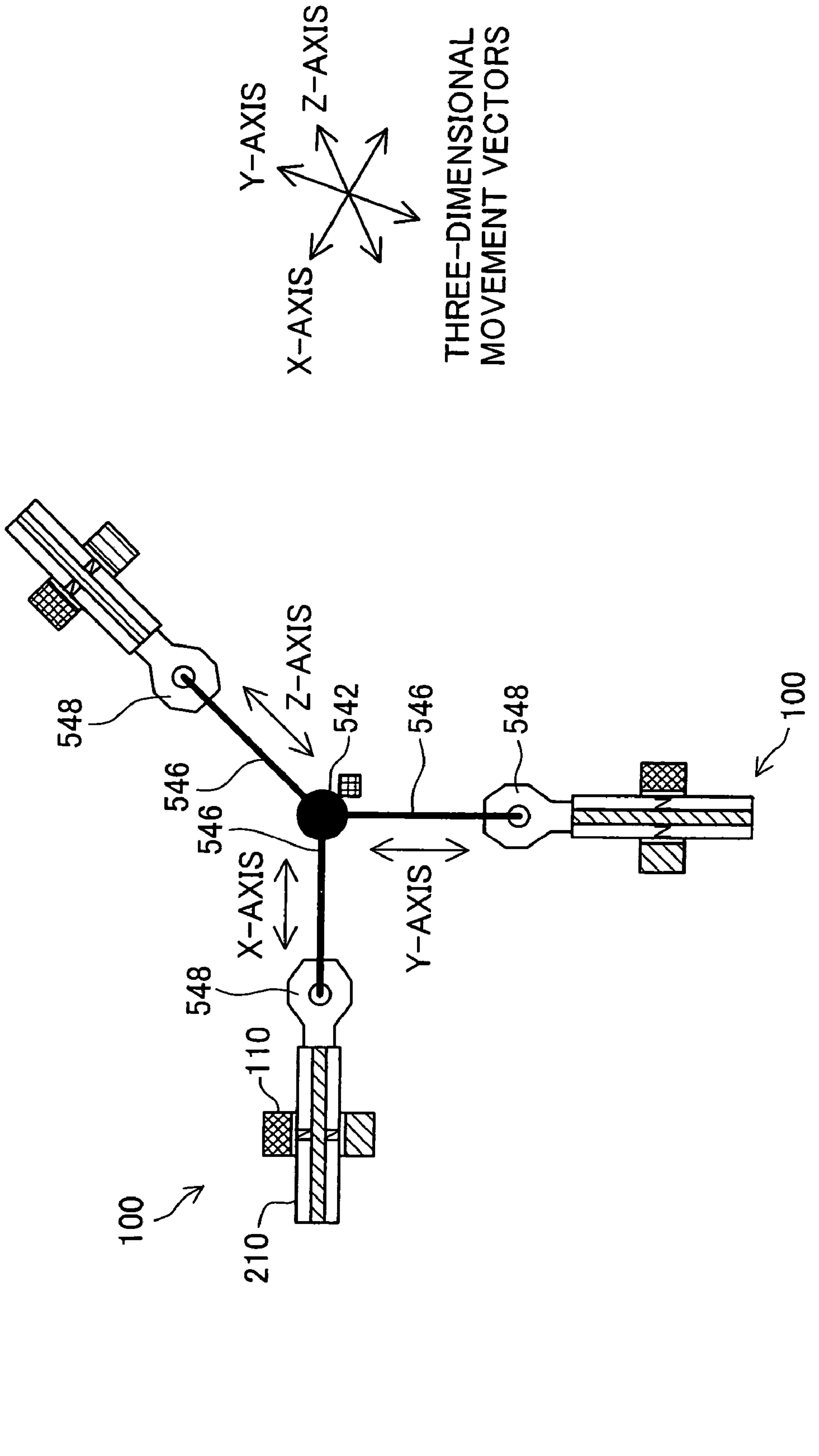
FIG. 31 is an explanatory drawing showing a fourth application example of an actuator according to an embodiment of the present invention.

FIG. 31 is an explanatory drawing showing a three-dimensional drive mechanism comprising a fourth application example of an actuator according to an embodiment of the present invention. This three-dimensional drive mechanism 540 includes three actuator mechanisms 100 that move a driven member 542 in a three-dimensional fashion. A link securing member 548 is secured to one end of the magnet unit 210 of each actuator mechanism 100, and the electromagnetic coil units 110 are secured to support members not shown. The three link securing members 548 are respectively connected to the driven member 542 by linear links 546. The magnet units 210 and link securing members 548 belonging to the three actuator mechanisms 100 move along three mutually perpendicular axes (X, Y and Z axes). As a result, when the three actuator mechanisms 100 are operated, the driven member 542 can be positioned in a three-dimensional fashion.

Figure 32A:
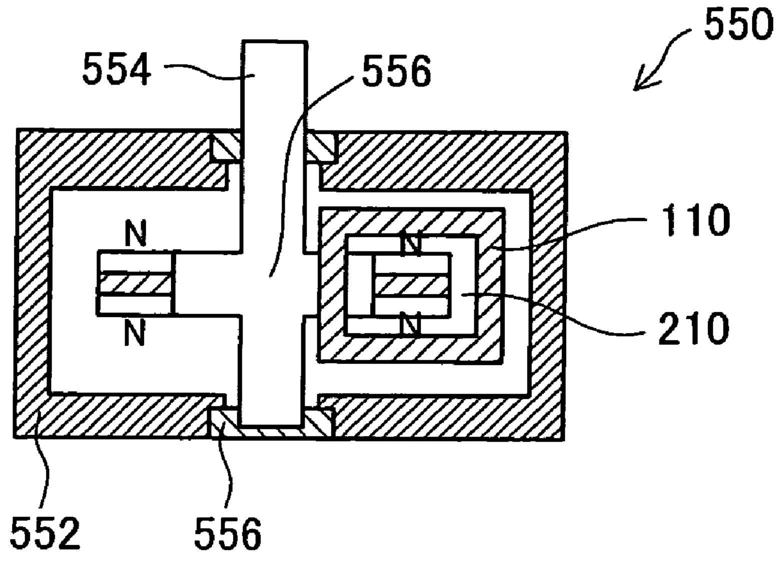
FIGS. 32A and 32B are explanatory drawing showing a fifth application example of an actuator according to an embodiment of the present invention.
Figure 32B:
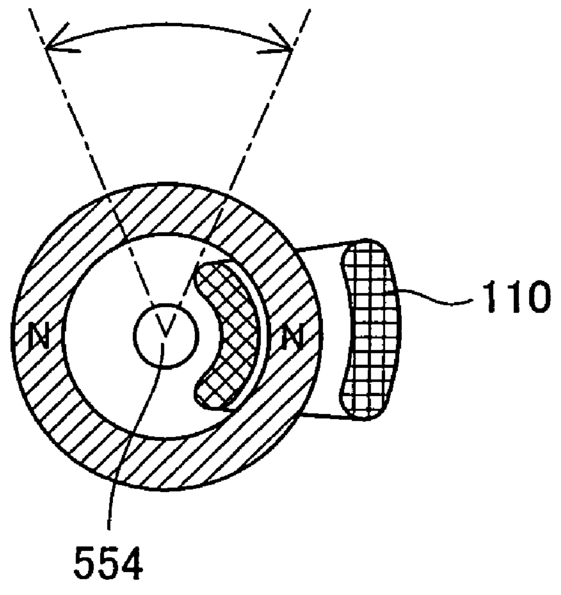

FIGS. 32A and 32B are explanatory drawings showing an annular actuator comprising a fifth application example of an actuator according to an embodiment of the present invention. This annular actuator 550 includes a hollow cylindrical case 552 and a rotor 556 that is housed in the case 552 and rotates around a rotational shaft 556. The rotational shaft 554 of the rotor 556 is supported by a bearing 556 belonging to the case 552. A magnet unit 210 is disposed on the rotor 556 and an electromagnetic coil unit 110 is disposed around the magnet unit 210. FIG. 32B shows the arrangement of the coil and magnets. Using this annular actuator 550, the rotor 556 can rotate within a range of 45 degrees.

Figure 33A:
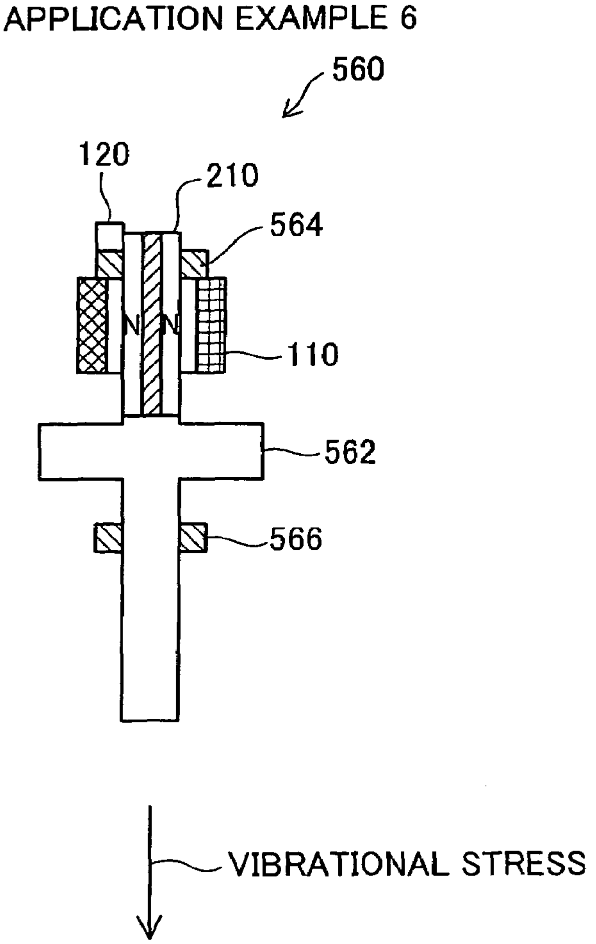
FIGS. 33A and 33B are explanatory drawings showing a sixth application example of an actuator according to an embodiment of the present invention.
Figure 33B:
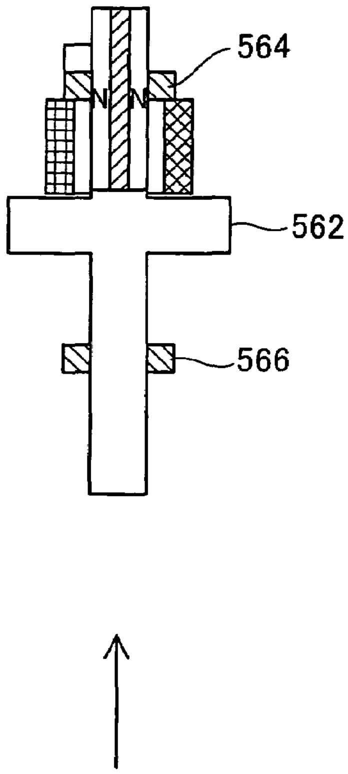

FIGS. 33A and 33B are explanatory drawings showing an electromagnetic suspension comprising a sixth application example of an actuator according to an embodiment of the present invention. This electromagnetic suspension 560 includes a suspension main unit 562 to which a magnet unit 210 is secured, an electromagnetic coil unit 110 secured to a support member 564 at a position at which it faces the magnet unit 210, and a lower limiter 566. A position sensor 120 is disposed on the electromagnetic coil 110. Using this actuator 560, the force and position of the suspension can be adjusted by adjusting the current impressed to the electromagnetic coil unit 110, thereby absorbing the upward and downward vibration stress.

Figure 34:
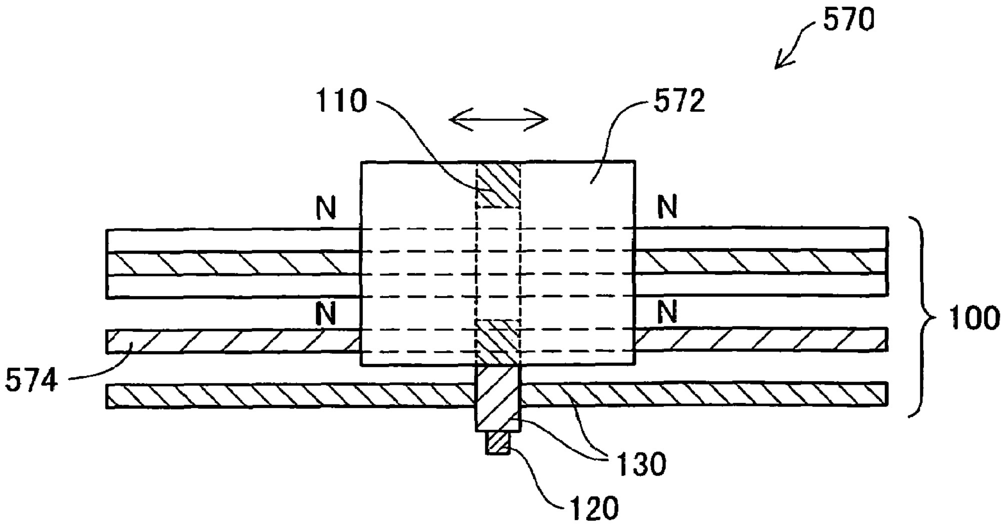
FIG. 34 is an explanatory drawing showing a seventh application example of an actuator according to an embodiment of the present invention.

FIG. 34 is an explanatory drawing showing a print head drive device comprising a seventh application example of an actuator according to an embodiment of the present invention. This print head drive device 570 moves a carriage 572 of a print head using the same mechanism as that of the actuator mechanism 100*h* shown in FIGS. 15A-15E. The carriage 572 is linked to the electromagnetic coil unit 110 and is guided along a guide rail 574. This actuator mechanism 100 comprises a kind of linear motor and can move the carriage 572 at a constant speed when current is impressed thereto.

Figure 35A:
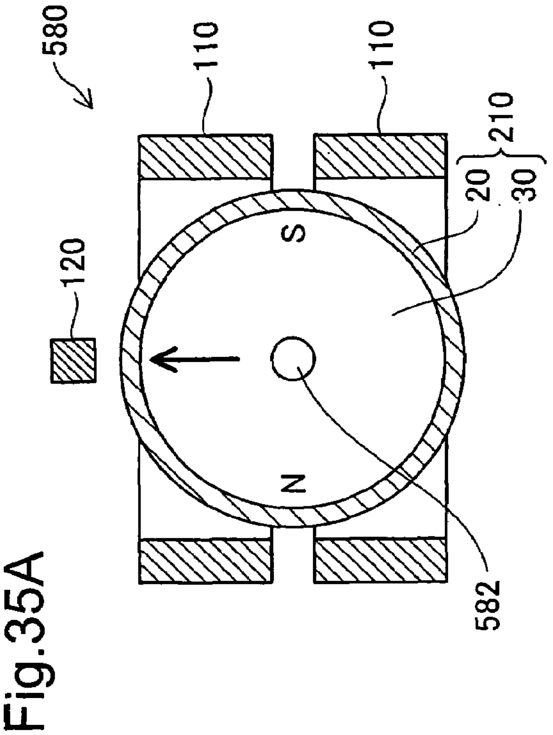
FIGS. 35A through 35D are explanatory drawings showing an eighth application example of an actuator according to an embodiment of the present invention.
Figure 35B:
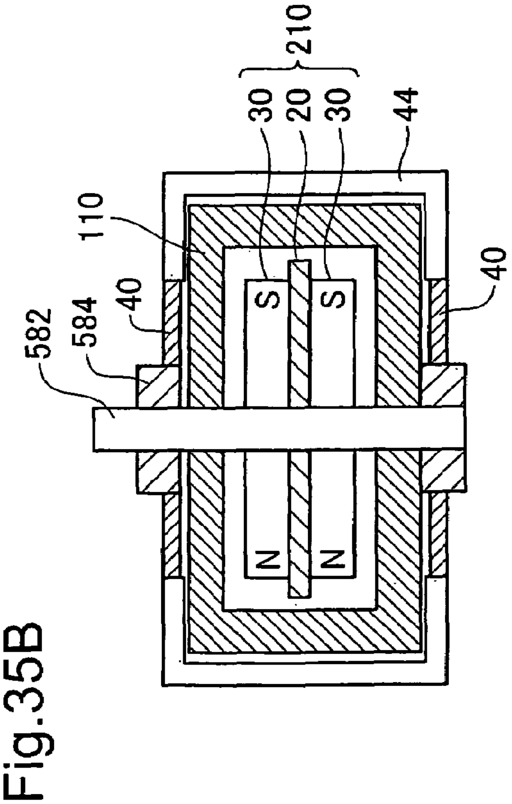
Figure 35C:
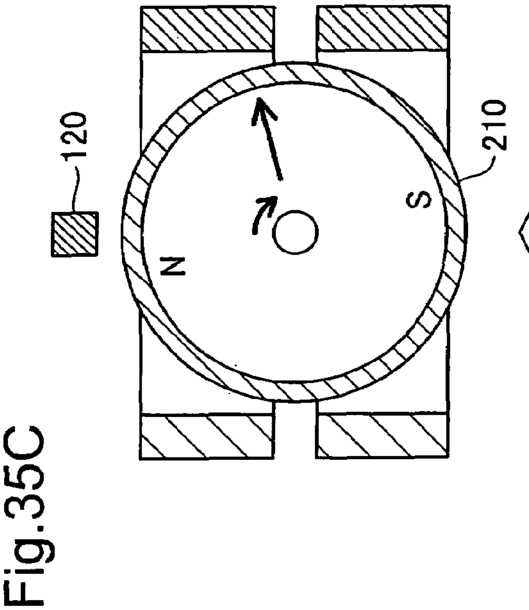
Figure 35D:
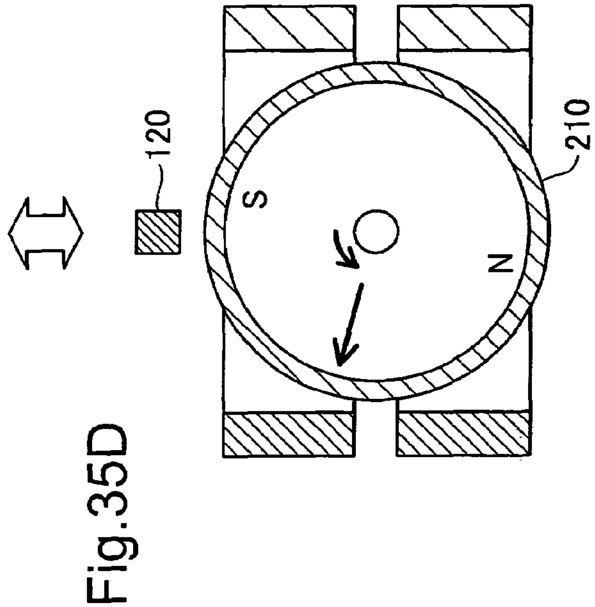

FIGS. 35A-35D are explanatory drawings showing an angle servo-controller comprising an eighth application example of an actuator according to an embodiment of the present invention. FIG. 35A is a plan view and FIG. 35B is a side view. The magnet unit 210 of the actuator mechanism used in this device comprises a disk-shaped yoke member 20 and two magnets 30 that are respectively disposed on the top and bottom surfaces of the yoke member. Each magnet 30 is magnetized parallel to the main surfaces. In the state shown in FIG. 35A, the right sides of the magnets 30 are the S poles while the left sides are the N poles. Two coils of an electromagnetic coil unit 110 are disposed around the magnet unit 210. These coils are wound perpendicular to the main surfaces of the magnet unit 210 such that they sandwich the top and bottom surfaces of the substantially disk-shaped magnet unit 210. The center of the magnet unit 210 is secured to a rotational shaft 582, which is supported by a bearing 584. Second yoke members 40 are disposed on the top and bottom surfaces of the case 44. In this angle servo-controller 580, the magnet unit 210 can be rotated clockwise or counterclockwise as shown in FIGS. 35A, 35C and 35D by impressing current to the electromagnetic coil unit 110. A position sensor 120 to detect the angle of rotation is disposed outside the magnetic unit 210.

D. Variations

The present invention is not limited to the examples and embodiments described above, and can be implemented in various other forms within the essential scope thereof For example, the following variations are possible.

In the control devices of the various embodiments, the controlled variable pertained to position, but control can be exerted regarding various other controlled variables than position. For example, the controlled variables can be light amount (i.e., in the case of an actuator that adjusts the aperture of an illumination optical system, for example), or flow volume or flow speed (i.e., in the case of an actuator for a flow control valve). Because the controlled variable changes depending on the position of the actuator in these cases as well, it can be thought to be related to the position of the actuator. In general, it is preferred that a sensor be included in order to directly or indirectly measure the controlled variable.

In the control devices of the embodiments, the reference current value was set to one of three values, i.e., a positive value, zero or a negative value, in accordance with whether the controlled variable (position) representing the deviation was a negative value, zero or a positive value, but it is also acceptable if instead the reference current value is set to a prescribed positive value or a prescribed negative value depending on the sign of the deviation. In this case, when the deviation is zero, the reference current value is set to whichever of the positive value or the negative value is selected in advance.

The constructions of the various actuator mechanisms and control devices used in connection with the embodiments described above are examples. Various other constructions may also be used.

What is claimed is:

1. An actuator that uses electromagnetic drive power, comprising:

an electromagnetic actuator mechanism that has a magnet unit including magnets and an electromagnetic coil unit including an electromagnetic coil, wherein relative positions of the magnet unit and the electromagnetic coil unit are variable; and a controller for controlling the electromagnetic actuator mechanism, the magnet unit including:

a yoke member including a plate portion; and a first and a second magnets that are magnetically pulled onto either side of the plate portion with the identical poles of each of the magnets facing each other across the plate portion, main surfaces of the plate portion of the yoke member being set to have a size which encompasses respective surfaces of the first and second magnets that face the plate portion, thereby causing the first and second magnets being magnetically pulled onto the plate portion, the electromagnetic coil unit including a first electromagnetic coil that faces the first magnet and a second electromagnetic coil that faces the second magnet, the relative position of the maanet unit and the electromagnetic coil unit being changeable in a moving direction that is perpendicular to a direction that travels through the first electromagnetic coil, the magnet unit and the second electromagnetic coil, and the controller supplying the first and second electromagnetic coils with mutually reverse electric currents, to thereby move the electromagnetic actuator mechanism in the moving direction while maintaining the relative position of the first and second electromagnetic coils.

2. The actuator according to claim 1, the plate portion having a first surface and a second surface, the first magnet including a pair of magnets that are disposed on the first surface of the plate portion and that are in contact with each other, the pair of the fist magnets being magnetized in mutually reverse magnetization directions along the direction that travels through the first electromagnetic coil, magnet unit and second electromagnetic coil, and the second magnet including a pair of magnets that are disposed on the second surface of the plate portion and that are in contact with each other, the pair of the second magnets being magnetized in mutually reverse magnetization directions along the direction that travels through the first electromagnetic coil, magnet unit and second electromagnetic coil.

3. The actuator according to claim 1, the plate portion having a first surface and a second surface, the first magnet including a pair of magnets that are disposed on the first surface of the plate portion and that are in contract with each other, the pair of the first magnets being magnetized in an identical magnetization direction along the moving direction, and the second magnet including a pair of magnets that are disposed on the second surface of the plate portion and that are in contact with each other, the pair of the second magnets being magnetized in an identical magnetization direction along the moving direction.

* * * * *